(12) United States Patent
Muramoto

(10) Patent No.: US 9,986,063 B2
(45) Date of Patent: May 29, 2018

(54) RECEIVING TERMINAL AND RECEIVING METHOD

(71) Applicant: Panasonic Intellectual Property Management Co., Ltd., Osaka (JP)

(72) Inventor: Eiichi Muramoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 14/647,052

(22) PCT Filed: Oct. 3, 2013

(86) PCT No.: PCT/JP2013/005916
§ 371 (c)(1),
(2) Date: May 22, 2015

(87) PCT Pub. No.: WO2014/083739
PCT Pub. Date: Jun. 5, 2014

(65) Prior Publication Data
US 2015/0312373 A1    Oct. 29, 2015

(30) Foreign Application Priority Data

Nov. 28, 2012 (JP) .................. 2012-259985

(51) Int. Cl.
*H04L 29/08* (2006.01)
*H04L 12/841* (2013.01)

(52) U.S. Cl.
CPC .......... *H04L 67/327* (2013.01); *H04L 47/283* (2013.01)

(58) Field of Classification Search
CPC ..... H04L 63/14; H04L 47/283; H04L 67/327; H04L 45/54; H04L 45/745; H04L 1/188; H04L 47/10; H04L 47/14; H04N 21/23106
See application file for complete search history.

(56) References Cited

U.S. PATENT DOCUMENTS

| 7,336,672 B1 * | 2/2008 | Aweya ............... H04L 47/10 370/412 |
| 7,782,867 B2 * | 8/2010 | Suzuki ............... H04L 45/02 370/255 |

(Continued)

FOREIGN PATENT DOCUMENTS

| EP | 2487824 A1 * | 8/2012 | .......... H04L 1/1822 |
| JP | 2009-219003 A | 9/2009 | |
| JP | 2010-124205 A | 6/2010 | |

OTHER PUBLICATIONS

. Lee et al.,, "Proxy-assisted content sharing using content centric networking (CCN) for resource-limited mobile consumer devices," in IEEE Transactions on Consumer Electronics, vol. 57, No. 2, pp. 477-483, May 2011, doi: 10.1109/TCE.2011.5955182 (Lee hereinafter) was published May 2011, pp. 477-483.*

(Continued)

*Primary Examiner* — Andrew Lai
*Assistant Examiner* — Hoyet H Andrews, III
(74) *Attorney, Agent, or Firm* — Seed IP Law Group LLP

(57) ABSTRACT

A receiving terminal (400) has: a reception stack unit (410) which connects to a communication network; an issuance management unit (440) which transmits a data request packet; and an H-RTT measurement unit (450) which determines a timeout period until retransmission of the data request packet, and in accordance with the determined timeout period, performs retransmission of the data request packet until data is received by the reception stack unit (Continued)

(410). The reception stack unit (410) connects to the communication network via a plurality of communication interfaces. The issuance management unit (440) transmits the data request packet from each of the plurality of communication interfaces. The H-RTT measurement unit (450), for each of the communication interfaces, measures the RTT between the communication interface and a data-bearing node, and on the basis of the RTT, determines a timeout period.

13 Claims, 11 Drawing Sheets

(56) References Cited

U.S. PATENT DOCUMENTS

| | | | | |
|---|---|---|---|---|
| 7,843,843 | B1* | 11/2010 | Papp, III | H04L 41/5009 370/252 |
| 8,165,118 | B2 | 4/2012 | Stewart et al. | |
| 8,204,060 | B2 | 6/2012 | Jacobson et al. | |
| 2002/0124096 | A1* | 9/2002 | Loguinov | H04L 1/0001 709/230 |
| 2002/0194361 | A1* | 12/2002 | Itoh | H04L 1/0002 709/233 |
| 2003/0120802 | A1* | 6/2003 | Kohno | H04L 29/06 709/237 |
| 2003/0133443 | A1* | 7/2003 | Klinker | H04L 29/06 370/353 |
| 2004/0098748 | A1* | 5/2004 | Bo | H04N 7/17336 725/105 |
| 2005/0044270 | A1* | 2/2005 | Grove | H04L 29/12018 709/238 |
| 2005/0169199 | A1* | 8/2005 | Futenma | H04L 29/06027 370/282 |
| 2005/0198351 | A1* | 9/2005 | Nog | H04L 45/306 709/232 |
| 2006/0092840 | A1* | 5/2006 | Kwan | H04L 47/10 370/230.1 |
| 2007/0239892 | A1* | 10/2007 | Ott | H04L 29/06 709/242 |
| 2009/0092124 | A1* | 4/2009 | Singhal | H04L 67/104 370/351 |
| 2009/0138968 | A1* | 5/2009 | Serber | H04L 63/14 726/22 |
| 2009/0172191 | A1* | 7/2009 | Dumitriu | H04L 67/1029 709/241 |
| 2009/0268747 | A1* | 10/2009 | Kurata | H04L 1/1832 370/412 |
| 2009/0285209 | A1 | 11/2009 | Stewart et al. | |
| 2010/0067393 | A1* | 3/2010 | Sakimura | H04L 43/0864 370/252 |
| 2010/0074113 | A1* | 3/2010 | Muramoto | H04L 43/0864 370/235 |
| 2010/0074134 | A1* | 3/2010 | Tatsuta | H04L 43/0864 370/252 |
| 2010/0183012 | A1* | 7/2010 | Konishi | H04L 1/1887 370/392 |
| 2011/0019555 | A1* | 1/2011 | Gotoh | H04W 52/0241 370/252 |
| 2011/0090908 | A1* | 4/2011 | Jacobson | H04L 45/745 370/392 |
| 2011/0238789 | A1* | 9/2011 | Luby | H04N 21/23106 709/219 |
| 2011/0302234 | A1* | 12/2011 | Monk, IV | H04L 65/80 709/203 |
| 2012/0221737 | A1* | 8/2012 | Miyazawa | H04L 43/0894 709/228 |

OTHER PUBLICATIONS

J. Lee et al.,, "Proxy-assisted content sharing using content centric networking (CCN) for resource-limited mobile consumer devices," in IEEE Transactions on Consumer Electronics, vol. 57, No. 2, pp. 477-483, May 2011, doi: 10.1109/TCE.2011.5955182 (LEE hereinafter) was published May 2011, pp. 477-483.*
Van Jacobson et al., titled "Networking Named Content"; presented in Rome, Italy—Dec. 1-4, 2009 ACM New York, NY, USA ©2009, table of contents ISBN: 978-1-60558-636-6 doi>10.1145/1658939.1658941.*
International Search Report dated Dec. 3, 2013, for corresponding International Application No. PCT/JP2013/005916, 2 pages.
Jacobson et al., "Networking Named Content," CoNEXT 2009, Palo Alto Research Center, Dec. 2009, 13 pages.
Wang et al., "OSPFN: An OSPF Based Routing Protocol for Named Data Networking," Technical Report NDN-0003, Jul. 25, 2012, 15 pages.

* cited by examiner

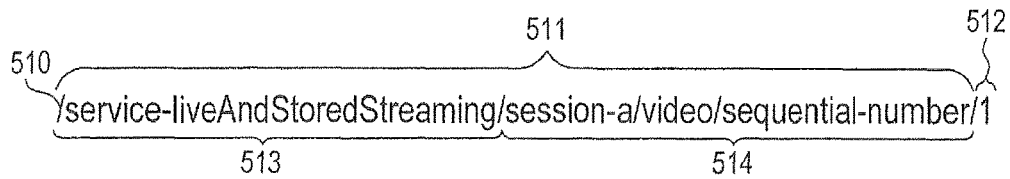
FIG. 3
| START TIME | END TIME | SERIAL NUMBER |
|---|---|---|
| T1 | T2 | 1–100 |
| T2 | T3 | 101–300 |
| T4 | T5 | 301–600 |
| ... | ... | ... |
FIG. 4
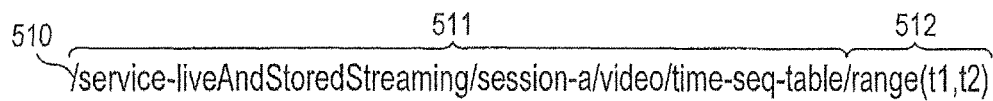
FIG. 5

550

| SERVICE NAME | SERVICE TYPE |
|---|---|
| s1 | Type-1 |
| s2 | Type-2 |
| s3 | Type-2 |
| s4 | Type-3 |

| SERVICE TYPE | TIMEOUT DETERMINATION POLICY |
|---|---|
| Type-1 | EMAWA |
| Type-2 | Largest |
| Type-3 | Latest-RTT |

FIG. 10

| FUNCTION |
|---|
| arearange(r1,r2) |
| timerange(t1,t2) |
| latest |

710 /service-loadcondition/time-tokyo-yokohama/timerange(t1,t2)
   _____/_____/
                       711                            712

720

| CONTENT NAME<br>(/service-loadcondition/time-tokyo-yokohama/range(t1,t2)) | 721 |
| --- | --- |
| SIGNATURE | 722 |
| SIGNED INFORMATION | 723 |
| OBSERVATION TIME | 724 |
| PASSAGE TIME | 725 |
| PASSAGE ROUTE INFORMATION | 726 |

730 ~ /service-loadcondition/sliped-point-tokyo-yokohama/timerange(t1,t2)

740 ~ /service-weathercondition/wiper-point-tokyo-yokohama/timerange(t1,t2)

750 ~ /service-weathercondition/temparature-today/arearange(xy1,xy2)

760 ~ /service-weathercondition/temparature-latest/arearange(xy1,xy2)

FIG. 17

RECEIVING TERMINAL AND RECEIVING METHOD

TECHNICAL FIELD

The present invention relates to a reception terminal that receives data by connecting to a communication network, and also to a reception method.

BACKGROUND ART

A technique called CCN (content centric network), which is disclosed in Non-Patent Literature (hereinafter, referred to as "NPL") 1, has attracted attention in recent years. CCN is a content distribution platform to manage a content based on the name of the content.

In CCN, the contents to be distributed, or data pieces obtained by splitting a content are named in advance. A terminal that acquires a content issues a packet called "interest packet" to request transmission of a content by specifying the name of the content (hereinafter, referred to as "content name").

Upon reception of an interest packet, a terminal that has published a content transmits a content corresponding to the content name specified by the interest packet to the terminal which is the transmitter of the interest packet. In this way, each terminal can acquire the content based on the content name without knowing where the content is. Hereinafter, the terminal that has published the content will be referred to as "transmission terminal" and the terminal that transmits an interest packet to attempt to receive content data will be referred to as "reception terminal."

CCN has an advantage that a content can be acquired from a router that has transferred the content in the past. In CCN, each router caches (temporarily stores) contents to be transferred from a transmission terminal to a reception terminal. If a content specified by a received interest packet is included in the cached contents, the router transmits the content to the reception terminal. In this way, in CCN, contents can be transmitted to the reception terminal without retransmission of the content from the transmission terminal to the router.

CCN capable of efficiently distributing contents is expected to be applied to a public communication network such as the Internet.

However, as represented by the Internet, many public communication networks are best-effort type communication networks. For this reason, with a best-effort type communication network, there may be missing (packet loss) in received data in interest packets or data packets due to congestion in the communication network or data being garbled during transmission or the like.

Thus, PTL 1 discloses retransmission of interest packets. Even when packet loss occurs, retransmission of interest packets allows data to be received later and can improve reliability of data delivery.

CITATION LIST

Patent Literature

PTL 1
US Patent Application Publication No. 2009-0285209

Non Patent Literature

NPL 1
V. Jacobson, D. K. Smetters, J. D. Thornton, M. F. Plass, N. H. Briggs and R. L. Braynard (PARC), "Networking Named Content," Italy, CoNEXT 2009, December, 2009.

NPL 2
Lan Wang. A K M MahmudulHoque, Cheng Yi, Adam Alyyan and Beichuan Zhang, "OSPFN: An OSPF Based Routing Protocol for Named Data Networking," Jul. 25, 2012.

SUMMARY OF INVENTION

Technical Problem

However, when a time period from transmission to retransmission of an interest packet (hereinafter referred to as "timeout period") is too long, retransmission of the interest packet is delayed and target data cannot be received at a high speed. On the other hand, when the timeout period is too short, the frequency with which unnecessary interest packets are retransmitted is increased, causing an increase of load on the network.

That is, with the prior arts, when data is received from a best-effort type network using CCN, it is difficult to make high-speed data reception compatible with a reduction of network load.

An object of the present invention is to make high-speed data reception compatible with a reduction of network load even when data is received from a best-effort type network using CCN.

Solution to Problem

A reception terminal disclosed herein includes: a reception that is configured to connect to a communication network; an issuance management section that transmits a data request packet to the communication network, the data request packet being a packet for requesting a data reply; and an H-RTT measuring section that determines a timeout period which is a time period until the data request packet is retransmitted and that retransmits the data request packet according to the determined timeout period until the reception stack receives the data, in which the reception stack connects to the communication network via a plurality of communication interfaces, the issuance management section transmits the data request packet from each of the plurality of communication interfaces, and the H-RTT measuring section measures, for each of the communication interfaces, an RTT (round trip time) between the communication interface and a data storage node and determines the timeout period for each of the communication interfaces based on the measured RTT, the data storage node being a node that stores the data.

A reception method disclosed herein includes: connecting to a communication network; transmitting a data request packet to the communication network, the data request packet being a packet for requesting a data reply; determining a timeout period which is a time period until the data request packet is retransmitted; and retransmitting the data request packet according to the determined timeout period, in which in the connecting, connection is made to the communication network via a plurality of communication interfaces, in the transmitting, the data request packet is transmitted from each of the plurality of communication interfaces, in the determining, an RTT (round trip time)

between the communication interface and a data storage node is measured for each of the communication interfaces, and the timeout period for each of the communication interfaces is determined based on the measured RTT, the data storage node being a node that stores the data, and in the retransmitting, when the data is received, retransmission of the data request packet is stopped in all of the plurality of communication interfaces.

Advantageous Effects of Invention

According to the present disclosure, it is possible to make high-speed data reception compatible with a reduction of network load even when data is received from a best-effort type network using CCN.

BRIEF DESCRIPTION OF DRAWINGS

FIG. 3 is a diagram illustrating an example of a content name according to Embodiment 2;

FIG. 4 is a diagram illustrating an example of a time sequence table according to Embodiment 2;

FIG. 5 is a diagram illustrating another example of a content name according to Embodiment 2;

FIG. 9 is a diagram illustrating an example of a service type table according to Embodiment 2;

FIG. 10 is a diagram illustrating an example of a timeout determination policy table according to Embodiment 2;

FIG. 17 is a diagram illustrating other examples of a content name according to present Embodiment 3.

DESCRIPTION OF EMBODIMENTS

Hereinafter, each embodiment of the present invention will be described in detail with reference to the accompanying drawings.

Embodiment 1

Embodiment 1 of the present invention is an exemplary basic mode of the present invention.

Figure 1:
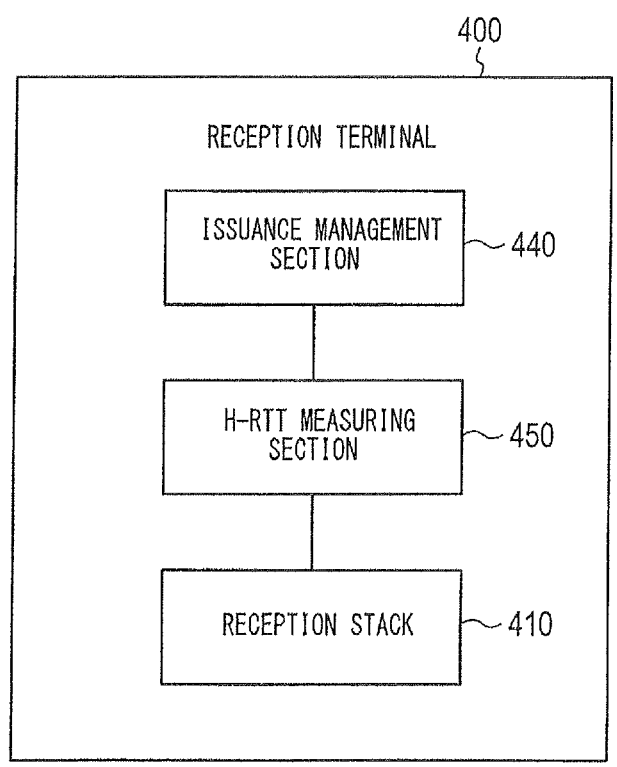
FIG. 1 is a block diagram illustrating a configuration example of a reception terminal according to Embodiment 1 of the present invention.

FIG. 1 is a block diagram illustrating a configuration example of a reception terminal according to the present embodiment.

In FIG. 1, reception terminal 400 includes reception stack 410, issuance management section 440 and H-RTT measuring section 450.

Reception stack 410 accesses a communication network. Issuance management section 440 transmits a data request packet which is a packet for requesting a data reply to the communication network. H-RTT measuring section 450 determines a timeout period which is a time period until the data request packet is retransmitted, and retransmits the data request packet until reception stack 410 receives data according to the determined timeout period.

However, reception stack 410 accesses the communication network via a plurality of communication interfaces. Issuance management section 440 transmits a data request packet from each of the plurality of communication interfaces. H-RTT measuring section 450 measures an RTT (round trip time) between the communication interface and a data storage node which is a node that stores data for each communication interface. H-RTT measuring section 450 determines a timeout period for each communication interface based on the measured RTT.

Note that, though not shown, reception terminal 400 includes, for example, a CPU (central processing unit), a storage medium such as a ROM (read only memory) that stores a control program, a work memory such as a RAM (random access memory) and a communication circuit. In this case, functions of the above-described sections are implemented by the CPU executing the control program.

Such reception terminal 400 can transmit and/or retransmit data request packets from a plurality of communication interfaces. Therefore, reception terminal 400 can receive data faster compared to a case where only one communication interface is used. That is, when receiving data from a best-effort type network using CCN, reception terminal 400 can implement faster data reception.

However, when useless interest packets are transmitted from the plurality of communication interfaces, the load on the communication network becomes heavier compared to a case where only one communication interface is used. On the other hand, an RTT up to a data storage node normally differs from one communication interface to another and an appropriate timeout period also differs from one communication interface to another.

Thus, as described above, reception terminal 400 measures an RTT between the communication interface and the data storage node (that is, between the communication interface and the data storage node of reception terminal 400) for each communication interface, and determines a timeout period for each communication interface based on the measured RTT. Thus, reception terminal 400 determines an appropriate timeout period for each communication interface, and can thereby reduce transmissions of useless interest packets from the plurality of communication interfaces.

Therefore, reception terminal 400 according to the present embodiment can make high-speed data reception compatible with a reduction of network load even when data is received from a best-effort type network using CCN.

Embodiment 2

Embodiment 2 of the present invention is an example of a specific aspect of the present invention when the present invention is applied to a CCN-compatible reception terminal. Hereinafter, a CCN-compatible node will be generically called "CCN node."

<Configuration of Communication System>

First, a description will be given of a configuration of the communication system according to the present embodiment.

Figure 2:
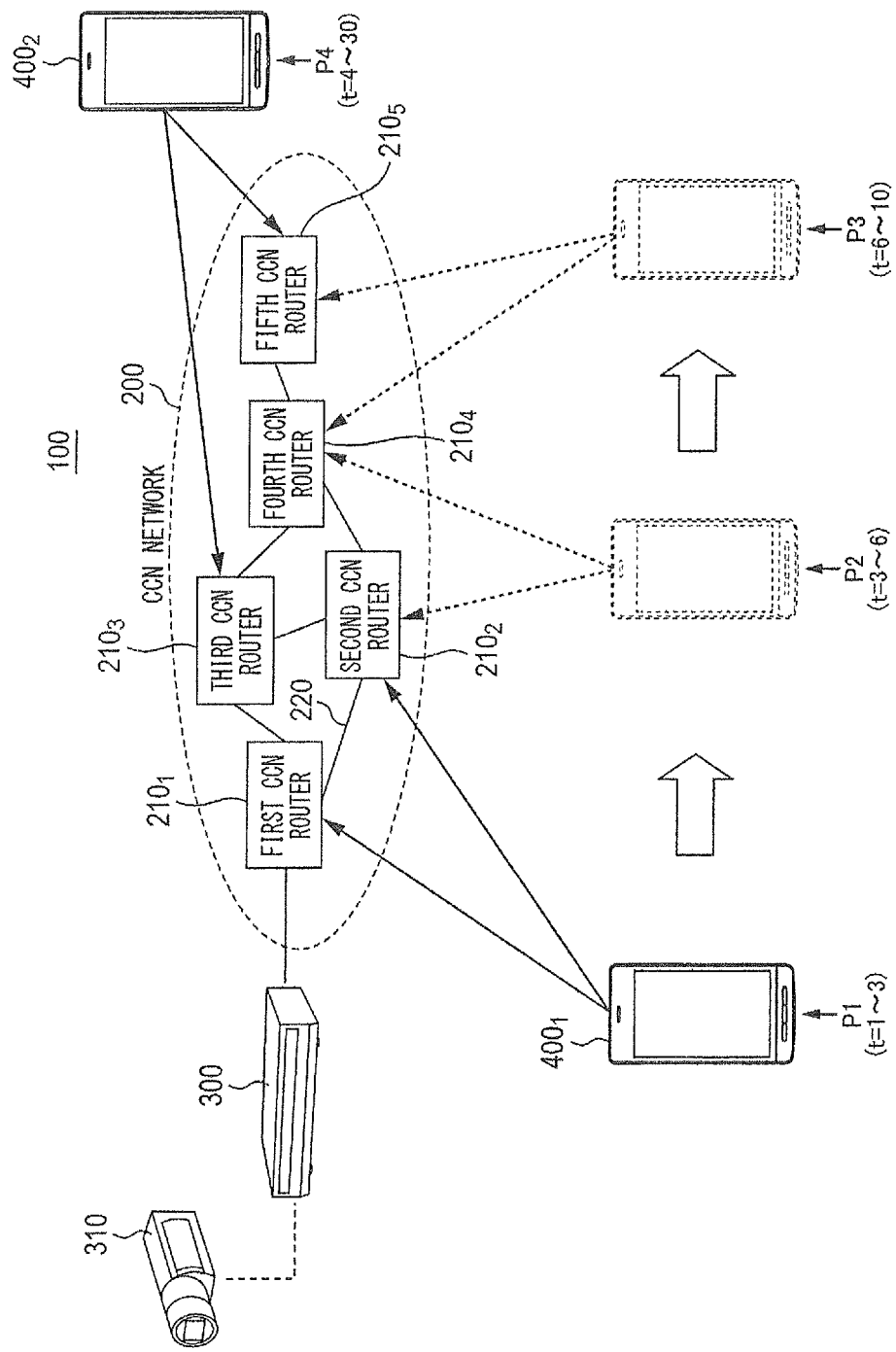
FIG. 2 is a system configuration diagram illustrating a configuration example of a communication system including a reception terminal according to Embodiment 2 of the present invention.

FIG. 2 is a system configuration diagram illustrating a configuration example of a communication system including a reception terminal according to the present embodiment.

In FIG. 2, communication system 100 includes CCN network 200, transmission terminal 300, first reception terminal $400_1$ and second reception terminal $400_2$.

CCN network 200 is a communication network using CCN. In the present embodiment, CCN network 200 includes first to fifth CCN routers $210_1$ to $210_5$ and a plurality of network connection media 220 that connect these routers. However, CCN network 200 is a best-effort type network (e.g., Internet) to which many nodes in addition to those illustrated ones are connected, with the many nodes mutually sharing a communication band.

Since first reception terminal $400_1$ and second reception terminal $400_2$ have an identical configuration, they will be described collectively as "reception terminal 400" as appropriate. Since first to fifth CCN routers $210_1$ to $210_5$ have an identical configuration, they will be described collectively as "CCN router 210" as appropriate.

CCN router 210 is a CCN-compatible router. That is, CCN router 210 receives an interest packet in CCN (hereinafter simply referred to as "interest packet"). The interest packet is a packet for requesting a data reply and makes up a "data request packet" of the present invention.

In the present embodiment, suppose that service types of services provided for the data are defined in advance for all pieces of data. In the following description, data whose reply is requested through an interest packet is called "target data" and a CCN node that stores the target data is called "data storage node." In the present embodiment, for example, transmission terminal 300 is a data storage node, and each CCN router 210 and reception terminal 400 can also be data storage nodes.

If CCN router 210 is a data storage node, CCN router 210 returns, upon receiving an interest packet, a packet that stores target data (hereinafter referred to as "data packet") to the transmitter of the interest packet. The transmitter of the interest packet is, for example, first reception terminal $400_1$ and will be referred to as "requester" hereinafter. When CCN router 210 is not a data storage node, CCN router 210 transfers the interest packet to other CCN nodes.

When transferring this interest packet, CCN router 210 records the transfer in a PIT (pending information table) of CCN router 210. When receiving an interest packet which is identical to the interest packet whose transfer is recorded in the PIT, CCN router 210 does not transfer the received interest packet (see NPL 1).

When receiving the corresponding data packet from the data storage node (e.g., transmission terminal 300), CCN router 210 transfers the data packet to the requester. In that case, CCN router 210 caches a replica of the transferred data packet and becomes one of data storage nodes hereinafter. That is, after caching a replica of the transferred data packet, CCN router 210 returns the data packet by itself without transferring the interest packet corresponding to the data to other CCN nodes.

When transferring this data packet, CCN router 210 deletes the recording of the transfer of the corresponding interest packet from the PIT of CCN router 210.

Network connection medium 220 is a wired or wireless communication channel connection medium. More specifically, network connection medium 220 is a public radio channel such as a wireless LAN channel, Ethernet (registered trademark) cable or WiFi (registered trademark), WiMAX (registered trademark) or LTE.

Transmission terminal 300 is a CCN node that first stores target data of first reception terminal $400_1$ and second reception terminal $400_2$ (hereinafter referred to as "transmitter"). That is, suppose that transmission terminal 300 is the only data storage node in communication system 100 at time 0 sec (t: 0 sec).

In the present embodiment, transmission terminal 300 is an apparatus that inputs video data from digital video camera 310. Transmission terminal 300 is an apparatus that encodes the video data inputted from time 0 sec (t: 0 sec) in real time and sends the encoded video data as a data packet. That is, transmission terminal 300 stores the video data and returns a data packet storing fractional parts obtained by dividing the video data according to the interest packet (hereinafter referred to as "divided data"). In this way, transmission terminal 300 implements live coverage of video (delivery of video streaming).

Transmission terminal 300 records a time stamp value indicating an input time (image taking time) of the divided data in each data packet. The time stamp value may be a time of a standard time or may be a relative time from a start time of video data. The time stamp value may be recorded using an RTP header defined in RFC3550, for example. Alternatively, the time stamp value may be recorded using an independently defined header based on a relative value relative to a clock synchronizable between transmission terminal 300 and each reception terminal 400. For example, transmission terminal 300 may mark an elapsed time of a reference clock from an encoder start time in a packet using 9000 Hz used in RTP transmission of video data as a reference clock.

Reception terminal 400 accesses CCN network 200 via two communication interfaces and transmits interest packets from the two communication interfaces respectively. That is, reception terminal 400 is a multi-interface terminal. Network connection medium 220 to which the two communication interfaces are connected may be of the same kind or different kinds. Reception terminal 400 measures an RTT between the communication interface and the data storage node for each communication interface and determines a timeout period which is a time period until the interest packet is retransmitted, based on the measured RTT.

In CCN, data to be transferred is identified not by the location of the data, but by a content name assigned to the data.

<Example of Content Name>

FIG. 3 is a diagram illustrating an example of a content name (an example of a name design).

As shown in FIG. 3, content name 510 is made up of service identification (user/app supplied name) region 511 and data fraction identification region 512.

Service identification region 511 as a whole describes a service name. Note that service identification region 511 is made up of globally-routable name region 513 and organizational name region 514. Globally-routable name region 513 describes a globally-routable name which is, for example, information used to establish a call. Organizational name region 514 describes, for example, information used for transmission in network connection medium 220.

Data fraction identification region 512 describes identification information of the divided data. Such identification information is, for example, a serial number assigned to the divided data.

In the example shown in FIG. 3, the description contents of service identification region 511 represent video data of a specific session in a video streaming service of stored or live coverage. The description contents of data fraction identification region 512 represent a serial number of "1" of the divided pieces of the video data.

Note that content name 510 may be information comprehensively indicating a plurality of divided pieces of data instead of information indicating only one divided piece of data. In this case, in each CCN node, content name 510 is interpreted using, for example, a time sequence table in which a serial number of a divided piece of data is associated with the time axis of the video data. That is, the CCN node may be interpreted as handling content name 510 as a so-called function and indicating a result of execution of the function.

FIG. 4 is a diagram illustrating an example of the time sequence table of the video data.

As shown in FIG. 4, time sequence table 520 describes each time range defined by a set of start time 521 and end time 522 associated with serial number 523 of a divided piece of data. Start time 521 and end time 522 are, for example, the time axis corresponding to an image taking time of the video data.

In the example in FIG. 4, serial number 523 of "1-100" is described in association with a set of start time 521 of "T1" and end time 522 of "T2." This indicates that video captured from time t=T1 to time t=T2 of standard time at a place of image taking of the video data corresponds to a divided data group from a serial number of "1" to a serial number of "100."

The length of each time range described in time sequence table 520 may be preferably set appropriately according to breakpoints of video scenes, such as 1 second or 30 seconds. The total time length of the time range described in time sequence table 520 is a total playback time such as 10 minutes.

The data storage node (e.g., transmission terminal 300) stores such time sequence table 520. Alternatively, the data storage node references time sequence tables 520 stored in other nodes as appropriate. In this way, the data storage node receives data specification by a time range or position range, and can provide a service of returning the corresponding data using time sequence table 520.

FIG. 5 is a diagram illustrating an example of a content name indicating the time range.

As shown in FIG. 5, content name 510 describes, for example, a service name of a service using a time sequence table in service identification region 511. Content name 510 describes, for example, a function indicating a time range of "range (t1, t2)" in data fraction identification region 512.

Transmission terminal 300 in FIG. 2 stores, for example, time sequence table 520 shown in FIG. 4 and receives an interest packet that specifies content name 510 shown in FIG. 5. In this case, transmission terminal 300 interprets "range( )" as a time-related function and interprets "t1" and "t2" as arguments indicating a time. That is, transmission terminal 300 interprets a function of "range (t1, t2)" as "a reply to a divided piece of data corresponding to the video captured from time t1 to time t2 is requested." Transmission terminal 300 interprets the corresponding divided data is a divided data group from serial number "1" to serial number "100" from time sequence table 520 shown in FIG. 4 and returns a data packet storing these pieces of data.

In this way, the time range is a closed time period. The position range is a closed space such as a section from point A to point B of a certain road. A technique of specifying such a time range or position range, and searching for data relating to the range is called "range search."

It should be noted that if each reception terminal 400 issues interest packets repeatedly by expanding a range search range to a future time by a time length of RTT later than the current time, this may cause congestion in entire CCN network 200. Therefore, it is preferable to avoid expansion of the range search range and repetitive transmission of interest packets.

Content name 510 described in FIG. 3 and FIG. 5 is binary-encoded and used.

Reception terminal 400 transmits an interest packet that stores the content name of the target data to CCN network 200.

<Configuration Example of Interest Packet>

Figure 6:
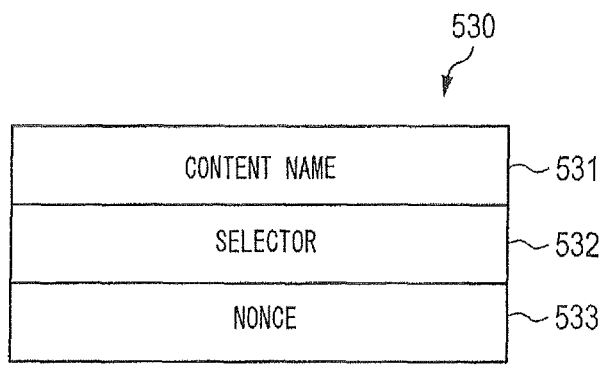
FIG. 6 is a diagram illustrating a configuration example of an interest packet according to Embodiment 2.

FIG. 6 is a schematic diagram of a configuration example of an interest packet.

As illustrated in FIG. 6, interest packet 530 includes content name 531, selector 532 and nonce 533. Content name 531 is a content name of divided pieces of video data that is specified to be returned by the request from the transmitter of interest packet 530. Content name 531 is, for example, content name 510 shown in FIG. 3 and FIG. 5. Nonce 533 is a nonce random number. Selector 532 is, for example, the priority of a request, a filter or a scope of a publication source or the like.

Such interest packet 530 specifies a divided piece of video data and shows that a delivery of the specified divided piece of data is requested by the transmitter of interest packet 530 (e.g., first reception terminal $400_1$). Interest packet 530 is provided with, e.g., information of the transmitter of interest packet 530, although not illustrated in the accompanying drawing.

The CCN node (e.g., transmission terminal 300) that stores (including caching) the divided piece of data specified by an interest packet is more specifically a data storage node. Upon receiving the interest packet, the data storage node generates a data packet that stores the specified divided piece of data (main signal). The relevant CCN node transmits the generated data packet to the transmitter of the interest packet.

<Configuration Example of Data Packet>

Figure 7:
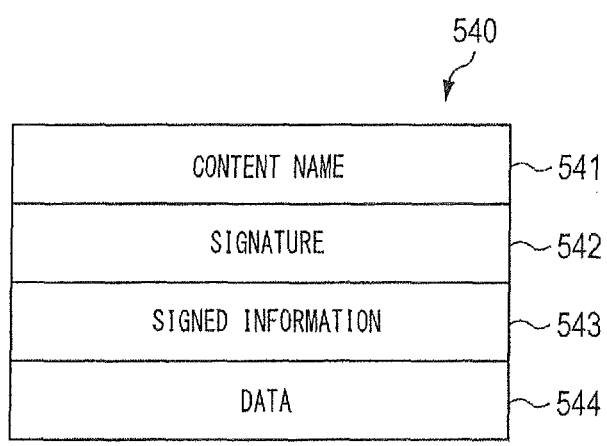
FIG. 7 is a diagram illustrating a configuration example of a data packet according to Embodiment 2.

FIG. 7 is a diagram illustrating a configuration example of a data packet.

As illustrate in FIG. 7, data packet 540 includes content name 541, signature 542, signed information 543 and data 544.

Data 544 is a divided piece of data stored in data packet 540. Content name 541 is a content name of a divided piece of data stored in data packet 540. That is, content name 541 is, for example, content name 510 shown in FIG. 3 and FIG. 5. Signature 542 is an electronic signature, which uses digest algorithm, witness or the like, for a divided piece of data stored in data packet 540. Signed information 544 includes a publisher ID, a key locator and a stale time, which are signed.

Data packet 540 as mentioned above can be transmitted with storing a divided piece of video data while certifying authenticity of the divided piece of data. Data packet 540 is provided with, e.g., information of a transmitter and destination of data packet 540, which are not illustrated in the accompanying drawing.

Each reception terminal 400 can acquire a content based on the content name using such a mechanism even when the whereabouts of the content are unknown. Specific examples of the operation of entire communication system 100 will be described later.

Such communication system 100 can acquire a content based on the content name even when each reception terminal 400 does not know the whereabouts of the content.

<Configuration of Each Apparatus>

Next, the respective configurations of CCN router 210 and reception terminal 400 will be described.

Figure 8:
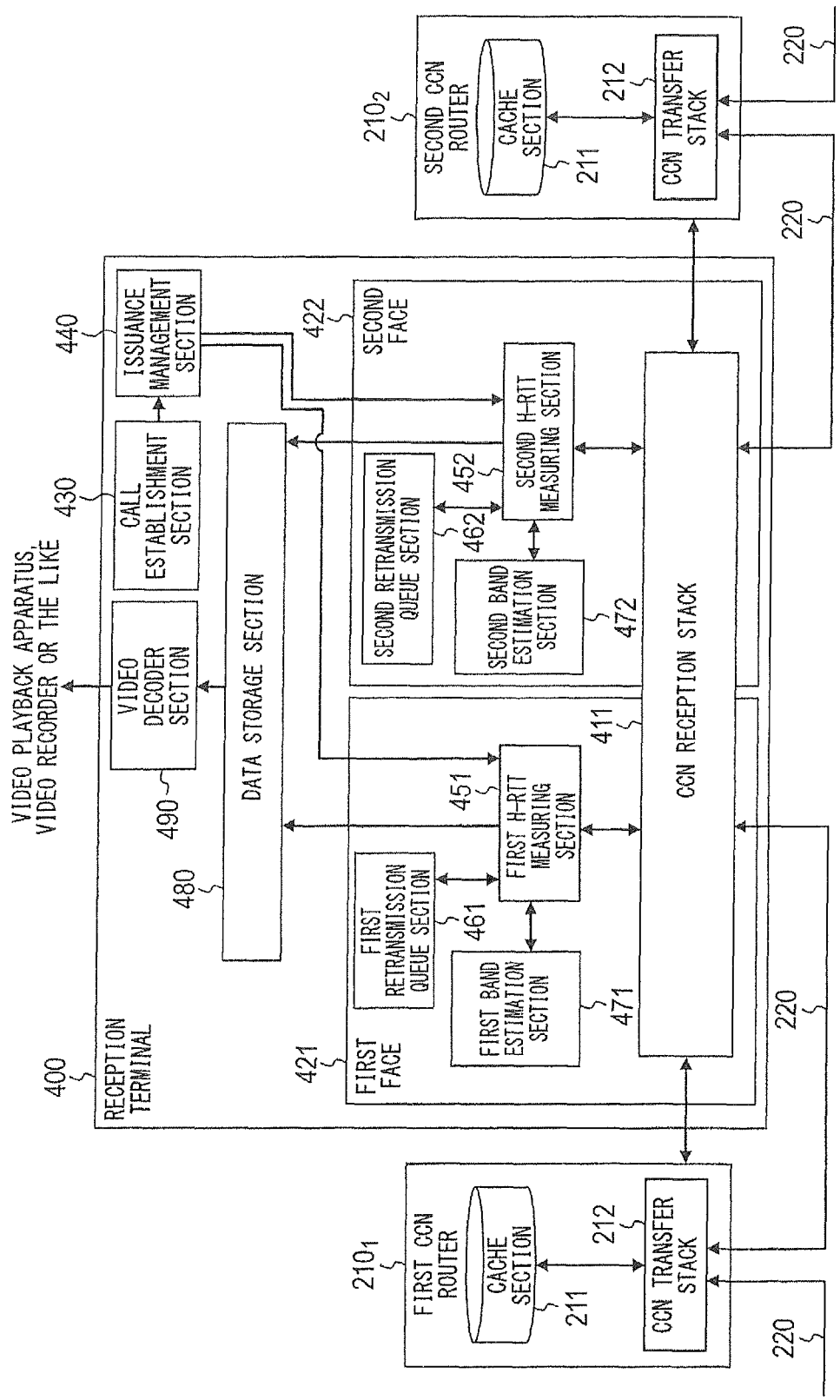
FIG. 8 is a block diagram illustrating a configuration example of the reception terminal according to Embodiment 2.

FIG. 8 is a block diagram illustrating a configuration example of CCN router 210 and reception terminal 400.

<Configuration of CCN Router>

In FIG. 8, CCN router 210 includes cache section 211 and CCN transfer stack 212.

Cache section 211 caches replicas of data packets transferred by CCN router 210 in the past from among data packets transmitted from transmission terminal 300.

CCN transfer stack 212 performs a CCN protocol operation. That is, CCN transfer stack 212 receives an interest packet transmitted from reception terminal 400. When the corresponding data packet is not cached in cache section 211, CCN transfer stack 212 transfers a received interest packet according to a transfer table stored in CCN transfer stack 212 to other CCN nodes.

In addition, CCN transfer stack 212 transfers a data packet transmitted from transmission terminal 300 to reception terminal 400 which is the destination of the data packet. More specifically, upon receiving a data packet, CCN transfer stack 212 transfers the data packet in a direction opposite to the direction in which an interest packet requesting the data packet was transferred. By each CCN router 210 performing such an operation, the data packet eventually arrives at reception terminal 400 which is the transmitter of the interest packet.

When transferring such a data packet, CCN transfer stack 212 causes cache section 211 to cache a replica of the data packet. When receiving an interest packet requesting the cached data packet from reception terminal 400, CCN transfer stack 212 transmits the data packet by itself without transferring the interest packet. That is, CCN transfer stack 212 returns the data packet cached in cache section 211 to reception terminal 400 which is the transmitter of the interest packet.

<Configuration of Reception Terminal>

In FIG. 8, reception terminal 400 includes CCN reception stack 411, first face 421, second face 422, call establishment section 430, issuance management section 440, data storage section 480 and video decoder section 490.

CCN reception stack 411 accesses CCN network 200 via network connection medium 220 and transmits and receives a packet. In the present embodiment, suppose that CCN reception stack 411 forms first face 421 and second face 422 which are independent communication interfaces. This allows CCN reception stack 411 to simultaneously access two CCN routers 210 as described in FIG. 2.

First face 421 and second face 422 each perform information management corresponding respectively to connected network connection media 220. First face 421 includes first H-RTT measuring section 451, first retransmission queue section 461 and first band estimation section 471. Second face 422 includes second H-RTT measuring section 452, second retransmission queue section 462 and second band estimation section 472. These functions will be described later.

Call establishment section 430 determines target data from among a plurality of pieces of data whose service type is defined and establishes a call between reception terminal 400 and a data storage node.

In the present embodiment, call establishment section 430 establishes a call for communication to receive a delivery of video streaming between reception terminal 400 and transmission terminal 300. More specifically, call establishment section 430 establishes a call (session-a) for a video delivery between reception terminal 400 and transmission terminal 300 that provides a service of providing target data (hereinafter referred to as "target service").

More specifically, call establishment section 430 issues an interest packet that specifies globally-routable name region 513 of content name 510 (see FIG. 3). Call establishment section 430 issues this interest packet via, for example, issuance management section 440, first and second H-RTT measuring sections 451 and 452, and CCN reception stack 411.

Suppose that a CCN node that provides the relevant service exists in (connected to) CCN network 200. In this case, a response (data packet) including organization name region 514 of content name 510 is returned from the CCN node (e.g., transmission terminal 300). Call establishment section 430 receives this data packet via, for example, CCN reception stack 410, first and second H-RTT measuring sections 451 and 452, and issuance management section 440.

This allows call establishment section 430 to generate service identification region 511 (service name of target service) of content name 510 using received organization name region 514 and establishes a call with the service provider.

Call establishment section 430 can establish a call to acquire video data for live coverage of video data between reception terminal 400 and the transmitter (transmission terminal 300 in the present embodiment). Alternatively, call establishment section 430 can also establish a call to acquire video data stored in the CCN node between reception terminal 400 and a CCN node other than the transmitter (any one CCN router 210 in the present embodiment).

When the call is established, call establishment section 430 reports the service name of a target service and serial numbers of divided pieces of the target data to issuance management section 440.

Issuance management section 440 manages issuance of interest packets to acquire a medium of a target service (video data or information data or the like). That is, issuance management section 440 generates an interest packet with the reported service name and the specified serial numbers. Issuance management section 440 then issues the generated interest packet to first H-RTT measuring section 451 and second H-RTT measuring section 452.

More specifically, issuance management section 440 describes the reported service name and serial numbers in service identification region 511 and data fraction identification region 512, and generates content name 510 (see FIG. 3 and FIG. 5). Issuance management section 440 then generates the interest packet that specified this content name 510. At this time, issuance management section 440 sequentially issues interest packets while increasing, for example, the value of data fraction identification region 512.

This allows issuance management section 440 to transmit an interest packet to CCN network 200 via first H-RTT measuring section 451 and second H-RTT measuring section 452, and CCN reception stack 411. Through consecutive issuances of interest packets, reception terminal 400 can consecutively receive video data delivered at a specific time (current or past).

However, as described above, first H-RTT measuring section 451 constitutes first face 421 and second H-RTT measuring section 452 constitutes second face 422. Therefore, issuance management section 440 transmits interest packets from the two communication interfaces respectively.

Note that suppose that issuance management section 440 of the present embodiment issues an identical interest packet to first H-RTT measuring section 451 and second H-RTT measuring section 452 substantially simultaneously.

First H-RTT measuring section 451 and second H-RTT measuring section 452 each transmit the interest packet issued from issuance management section 440 via CCN reception stack 411.

More specifically, first H-RTT measuring section 451 transmits the interest packet issued from issuance management section 440 from first face 421 to CCN network 200 via CCN reception stack 411. First H-RTT measuring section 451 stores a replica of the interest packet in first retransmission queue section 461 in association with a transmission time of the interest packet.

On the other hand, second H-RTT measuring section 452 transmits the interest packet issued from issuance management section 440 from second face 422 to CCN network 200 via CCN reception stack 411. Second H-RTT measuring section 452 stores a replica of the interest packet in second retransmission queue section 462 in association with a transmission time of the interest packet.

First H-RTT measuring section 451 and second H-RTT measuring section 452 receive data packets returned from CCN network 200 via CCN transfer stack 212. First H-RTT measuring section 451 and second H-RTT measuring section 452 output the received data packets to data storage section 480. Furthermore, first H-RTT measuring section 451 and second H-RTT measuring section 452 delete the interest packets corresponding to the received data packets from both first retransmission queue section 461 and second retransmission queue section 462.

First H-RTT measuring section 451 and second H-RTT measuring section 452 determine timeout periods which are time periods until the interest packets are retransmitted respectively.

More specifically, first H-RTT measuring section 451 measures an RTT between reception terminal 400 and the data storage node for first face 421 from a difference between the transmission time of the interest packet and the reception time of the corresponding data packet. First H-RTT measuring section 451 determines the timeout period of the interest packet transmitted from first face 421 based on a statistical value of the measurement result.

On the other hand, second H-RTT measuring section 452 measures an RTT between reception terminal 400 and the data storage node for second face 422 from a difference between the transmission time of the interest packet and the reception time of the corresponding data packet. Second H-RTT measuring section 452 determines the timeout period of the interest packet transmitted from second face 422 based on a statistical value of the measurement result.

That is, first H-RTT measuring section 451 and second H-RTT measuring section 452 measure RTTs between reception terminal 400 and the data storage node for each communication interface. First H-RTT measuring section 451 and second H-RTT measuring section 452 determine the timeout period for each communication interface based on the measured RTTs.

First H-RTT measuring section 451 and second H-RTT measuring section 452 record and manage information identifying the arrival time and the transmitter of the received data packets respectively. The information identifying the transmitter may be a transmitter IP address when, for example, CCN network 200 is an IP (Internet Protocol) network such as the Internet. Alternatively, the information identifying the transmitter may be a transmitter address of a Layer 2 packet such as MAC address when CCN network 200 is a wireless ad-hoc network.

That is, first H-RTT measuring section 451 and second H-RTT measuring section 452 retransmit interest packets until CCN reception stack 411 receives data according to the timeout periods determined by themselves. More specifically, first retransmission queue section 461 and second retransmission queue section 462 each perform retransmission for each interest packet when the timeout periods indicated by the corresponding transmission time and timeout value come.

First retransmission queue section 461 and second retransmission queue section 462 each store interest packets inputted from first H-RTT measuring section 451 and second H-RTT measuring section 452.

First band estimation section 471 estimates an available band of first face 421 based on a reception situation of data packets and RTT measurement result in first H-RTT measuring section 451. Here, the term "available band" refers to a band available to receive target data.

Second band estimation section 472 estimates an available band of second face 422 based on a reception situation of data packets and RTT measurement result in second H-RTT measuring section 452.

That is, first band estimation section 471 and second band estimation section 472 estimate available bands between reception terminal 400 and the data storage node for each communication interface.

First H-RTT measuring section 451 determines whether or not to suppress transmission of interest packets from first face 421 based on the available band estimated by first band estimation section 471. On the other hand, second H-RTT measuring section 452 determines whether or not to suppress transmission of interest packets from second face 422 based on the available band estimated by second band estimation section 472.

That is, reception terminal 400 of the present embodiment determines for each face, whether or not to suppress transmission of interest packets based on the estimated available band.

Data storage section 480 extracts divided pieces of data from data packets inputted from first H-RTT measuring section 451 and second H-RTT measuring section 452, sort the divided pieces of data in target order according to the serial numbers and outputs the sorted divided pieces of data to video decoder section 490. That is, data storage section 480 reconstructs the original video data from the divided pieces of data.

More specifically, data storage section 480 temporarily stores the divided pieces of data extracted from the inputted data packets and outputs the divided pieces of data to video decoder section 490 when a time comes at which the data should be played back.

The length of time during which each divided piece of data is stored in data storage section 480 may be m (m is a positive integer) times the timeout period or may be a fixed value. For example, the length of time during which each divided piece of data is stored may be a length obtained by multiplying a maximum value of the timeout period determined in entire reception terminal 400 by m.

In this case, while interest packets are retransmitted m times at maximum, divided pieces of data are not inputted to video decoder section 490 and video at delayed timing is outputted instead. On the other hand, even in an environment in which packet loss has occurred, divided pieces of data are more likely to have been stored by the time at which data should be played back.

Note that data storage section 480 determines the time at which each divided piece of data should be played back with reference to not the arrival time of packet but the time indicated by the time stamp value recorded in the data packet.

Video decoder section 490 interprets the inputted video data appropriately, converts the video data to a signal displayable by an external apparatus such as a video playback apparatus or video recorder, and transmits the converted signal to the relevant external apparatus.

Reception terminal 400 includes, for example, a CPU, a storage medium such as ROM that stores a control program, a work memory such as RAM and a communication circuit. In this case, functions of the sections described above are achieved by the CPU executing the control program.

In such a configuration, reception terminal 400 can transmit and retransmit interest packets from the two communication interfaces. Reception terminal 400 measures an RTT between reception terminal 400 and the data storage node for each communication interface, and can thereby determine a timeout period.

In this way, reception terminal 400 can receive target data at a high speed from CCN network 200 which is a best-effort type network using CCN while preventing increases in the network load.

<Selecting Timeout Determination Policy Based on Service Name>

Note that in the present embodiment, above-described first H-RTT measuring section 451 and second H-RTT measuring section 452 change operation of a timeout period according to the service type of the target data.

That is, suppose that first H-RTT measuring section 451 and second H-RTT measuring section 452 determine a timeout determination policy for each piece of target data according to the service type of the target data. Here, the term "timeout determination policy" refers to a policy when the timeout period is determined based on an RTT.

In this case, first H-RTT measuring section 451 and second H-RTT measuring section 452 store, for example, a plurality of timeout determination policies, service type tables and timeout determination policy tables. The service type table is a table that describes the correspondence between a service name and a service type. The timeout determination policy table is a table that describes the correspondence between a service type and a timeout determination policy.

FIG. 9 is a diagram illustrating an example of the service type table.

As shown in FIG. 9, service type table 550 describes service name 551 in association with service type 552. Service name 551 corresponds to the service name described in service identification region 511 of content name 510 (see FIG. 3 and FIG. 5).

FIG. 10 is a diagram illustrating an example of the timeout determination policy table.

As shown in FIG. 10, timeout determination policy table 560 describes service type 561 in association with timeout determination policy 562. Service type 561 corresponds to service type 552 of service type table 550.

As timeout determination policy 562, for example, three timeout determination policies of "EMAWA," "Largest" and "Latest-RTT" are defined as shown in FIG. 10.

"EMAWA" has a content of determining a timeout period from an exponential weighted average of a plurality of RTTs measured in the past for each communication interface. "Largest" has a content of determining a timeout period from a maximum value of a plurality of RTTs measured for a predetermined section in the past in first face 421 and second face 422 as a whole. "Latest-RTT" has a content of determining a timeout period based on the latest one of RTTs measured for each communication interface.

First H-RTT measuring section 451 and second H-RTT measuring section 452 select a timeout period determination policy for each piece of target data using, for example, these tables and determine a timeout period according to the selected policy.

First H-RTT measuring section 451 and second H-RTT measuring section 452 may use a table that integrates service type table 550 and timeout determination policy table 560. Alternatively, first H-RTT measuring section 451 and second H-RTT measuring section 452 may also select a timeout period determination policy not in the form of table reference but in the form of execution of a determination processing flow which will be described later.

<Operation of Reception Terminal>

Next, the operation of reception terminal 400 will be described.

Figure 11:
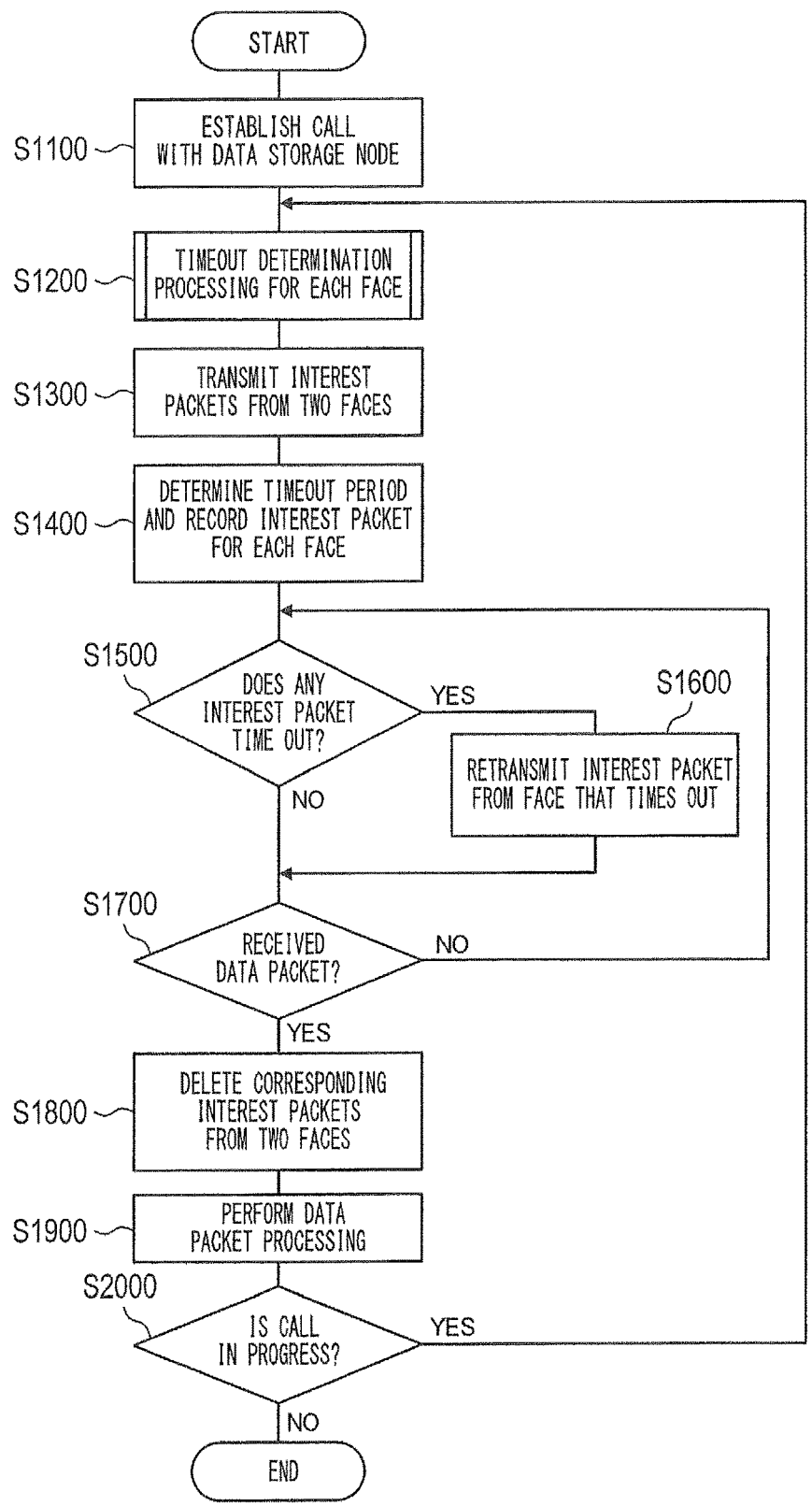
FIG. 11 is a flowchart illustrating an example of operation of the reception terminal according to Embodiment 2.

FIG. 11 is a flowchart illustrating an example of the operation of reception terminal 400. Reception terminal 400 performs the operation shown in FIG. 11 every time data reception is instructed when, for example, a service name is inputted by a user operation.

First, in step S1100, call establishment section 430 establishes a call between reception terminal 400 and a data storage node (e.g., transmission terminal 300 or CCN router 210).

At this point in time, transmission of an interest packet and reception of a data packet corresponding to the interest packet have been performed at least once.

Upon receiving a data packet using one face, CCN reception stack 411 inspects whether or not the data packet corresponds to an interest packet transmitted by itself. When the received data packet matches the transmitted interest packet, CCN reception stack 411 adds the information together with information indicating an arrival time (reception time) of the data packet to the received data packet. CCN reception stack 411 outputs the data packet to first H-RTT measuring section 451 and second H-RTT measuring section 452.

First H-RTT measuring section 451 and second H-RTT measuring section 452 search for the inputted data packet in first retransmission queue section 461 and second retransmission queue section 462 respectively. First H-RTT measuring section 451 and second H-RTT measuring section 452 inspect whether or not the inputted data packets match the data packets corresponding to the interest packets transmitted from the respective faces.

When the inputted data packets match the interest packets transmitted from the corresponding faces, first H-RTT measuring section 451 and second H-RTT measuring section 452 complete the reception of the data packets.

In step S1200, first H-RTT measuring section 451 and second H-RTT measuring section 452 perform timeout determination processing. The timeout determination processing is processing that determines, for each face, a timeout period in retransmission of an interest packet according to the service type.

In the present embodiment, suppose that first H-RTT measuring section 451 and second H-RTT measuring section 452 implement contents of timeout determination policy table 560 by executing the timeout determination processing. Details of the timeout determination processing will be described later.

In step S1300, issuance management section 440 transmits interest packets from both first face 421 and second face 422 via first H-RTT measuring section 451 and second H-RTT measuring section 452.

In step S1400, first H-RTT measuring section 451 sets the determined timeout period and records the interest packet in first retransmission queue section 461. Second H-RTT measuring section 452 sets the determined timeout period and records the interest packet in second retransmission queue section 462.

In step S1500, first H-RTT measuring section 451 and second H-RTT measuring section 452 determine whether or not one of the transmitted interest packets times out. More specifically, first H-RTT measuring section 451 determines whether or not one of timeout periods set in the interest packets stored in first retransmission queue section 461 times out. Second H-RTT measuring section 452 determines whether or not one of timeout periods set in the interest packets stored in second retransmission queue section 462 times out.

When one interest packet times out (S1500: YES), first H-RTT measuring section 451 and second H-RTT measuring section 452 proceed to step S1600. When no interest packet times out (S1500: NO), first H-RTT measuring section 451 and second H-RTT measuring section 452 proceed to step S1700 which will be described later.

In step S1600, one of first H-RTT measuring section 451 and second H-RTT measuring section 452 whose interest packet times out retransmits an interest packet from the corresponding face. In this case, the measuring section that has retransmitted the interest packet sets a timeout period in the corresponding retransmission queue section and records the interest packet as in the case where the interest packet was transmitted first.

In step S1700, first H-RTT measuring section 451 and second H-RTT measuring section 452 determine whether or not a data packet has been received.

When no data packet has been received (S1700: NO), first H-RTT measuring section 451 and second H-RTT measuring section 452 return to step S1500. On the other hand, when a data packet has been received (S1700: YES), first H-RTT measuring section 451 and second H-RTT measuring section 452 proceed to step S1800.

In step S1800, one of first H-RTT measuring section 451 and second H-RTT measuring section 452 which has received a data packet outputs the data packet to data storage section 480. The measuring section that has received a data packet deletes the corresponding interest packet from first face 421 and second face 422 (that is, from first retransmission queue section 461 and second retransmission queue section 462).

In step S1900, data storage section 480 performs a process (extraction of divided pieces of data, connection according to serial numbers) on the inputted data packet.

In step S2000, issuance management section 440 determines whether or not reception of all pieces of target data has been completed in step S1100. When reception of all pieces of target data has not been completed (S2000: YES), issuance management section 440 returns to step S1200. When a call is disconnected (S2000: NO), issuance management section 440 ends a series of processes.

In FIG. 11, a description has been given assuming a series of operations from establishment to end of a call, but similar interest packet retransmission management is also performed even in the case of an application that turns a playback time back in a single call, for example. For example, in the case of an application that browses past videos of a monitoring camera, after a call is established, an image to be acquired may be one hour or 10 minutes ahead, but the same method may be applicable to retransmission management of respective interest packets.

Even in the case where information is acquired which is made up of a single packet, which will be described later in an example where congestion information is acquired, retransmission management of interest packets is likewise applicable.

Figure 12:
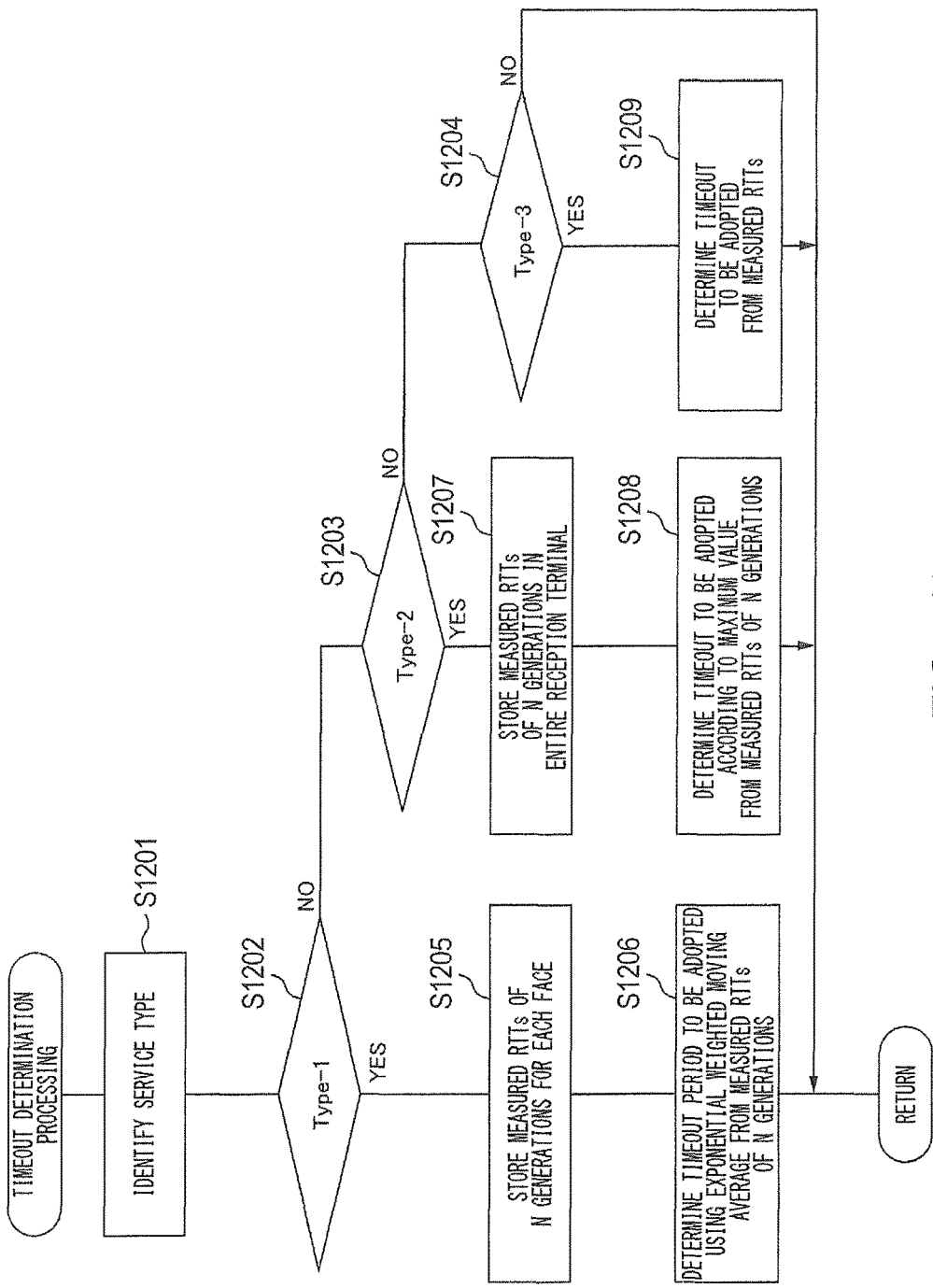
FIG. 12 is a flowchart illustrating an example of timeout determination processing according to Embodiment 2.

FIG. 12 is a flowchart illustrating an example of a timeout determination process (S1200).

First, in step S1201, one of first H-RTT measuring section 451 and second H-RTT measuring section 452 which has received data packet (hereinafter referred to as "reception measuring section") identifies a service type of the target data. More specifically, the reception measuring section refers to service type table 550 (see FIG. 9), for example. The reception measuring section designates a service type corresponding to the service name described in service identification region 511 of content name 510 (see FIG. 3 and FIG. 5) as a service type of the target data.

The reception measuring section branches the subsequent process based on determination processes shown in steps S1202 and S1203. That is, when the identified service type is "Type-1," the reception measuring section proceeds to steps S1205 and S1206. When the identified service type is "Type-2," the reception measuring section proceeds to steps S1207 and S1208. When the identified service type is "Type-3," the reception measuring section proceeds to step S1209.

In step S1205, the reception measuring section measures an RTT based on the received data packet and stores the measured RTT. This measured RTT is stored over at least N generations (N is an integer equal to or greater than 2) for each face. That is, reception terminal 400 stores measured RTTs of N generations for each face. Here, the "generation" corresponds to the number of measured RTTs. Storage of RTTs corresponding to N generations can be easily realized based on principles of FIFO (First In First Out).

In step S1206, the reception measuring section calculates an exponential weighted moving average from RTTs corresponding to the N generations measured in the past at the corresponding face and thereby determines a timeout period to be adopted. For example, the reception measuring section determines a timeout period RTO (Retransmission Time Out) using following equation 1. Here, $RTT_i$ is an RTT measured value i generations ahead (i is an integer of 1 to N) and $\alpha_i$ is a weight corresponding to $RTT_i$ (where, a total value of $\alpha_1$ to $\alpha_N$ is N). $\beta$ is a real number equal to or greater than 1.

[1]

$$RTO = \beta \times \Sigma (RTT_i \times \alpha_i)/N \qquad \text{(Equation 1)}$$

As in the case of the present embodiment, when reception terminal 400 accesses CCN network 200 via wireless communication, the reception measuring section may change weight αi according to the value indicating a wireless congestion state obtained from the driver of Layer 2. When the value indicating the wireless congestion state is large, the reception measuring section changes the distribution of weight $\alpha_i$ so that weight $\alpha i$ of the RTT measured value in a newer generation increases.

Alternatively, the reception measuring section may calculate an RTT using equation 2 as calculated inside TCP (Transmission Control Protocol) and further calculate timeout value RTO using equation 3. Here, $RTT_m$ is a latest RTT (RTT measured this time).

[2]

$$RTT = a \times RTT + (1-a) \times RTT_m \qquad \text{(Equation 2)}$$

[3]

$$RTO = RTT + 4 \times D \qquad \text{(Equation 3)}$$

where, a=7/8, D=a×D+(1−a)×|RTT−$RTT_m$|

In addition, β=(RTT+4×D)/RTT may also be used as β in equation 1.

First H-RTT measuring section 451 and second H-RTT measuring section 452 may adopt a maximum value among reasonable timeout periods corresponding to CCN network 200 as an initial value of the timeout period. For example, when CCN network 200 is operated on the Internet, the initial value of the timeout period may be preferably on the order of 500 ms.

When a large number of nodes are connected to CCN network 200, the initial value of the timeout period is preferably a value equivalent to the value of a TCP keep alive time. When reception terminal 400 is connected to CCN network 200 via wireless communication, the initial value of the timeout period is preferably a maximum value (e.g., 30 sec) which can prevent collision.

In step S1207, the reception measuring section measures RTTs based on the received data packet and stores a number of measured RTTs corresponding to N generations for entire reception terminal 400.

In step S1208, the reception measuring section extracts a maximum value from the RTTs corresponding to N generations measured in the past in entire reception terminal 400 and thereby determines a timeout period to be adopted.

In step 1209, the reception measuring section determines the timeout period to be adopted based on $RTT_m$ (RTT measured this time) of the RTTs measured in the past. For example, the reception measuring section calculates timeout period RTO using following equation 4. Here, 3 is a real number equal to or greater than 1.

[4]

$$RTO = \beta \times RTT_m \qquad \text{(Equation 4)}$$

Note that the reception measuring section may also determine whether or not priority should be given to, for example, a reduction of processing load of reception terminal 400 or load on the data transmission route over the data reception speed. The reception measuring section may select Type-2 based on the determination that a reduction of load should be given priority over the reception speed as a condition. That is, the reception measuring section may take a CPU load of reception terminal 400 and a channel use condition load into consideration and forcibly select Type-2 when these loads are high.

<Technique of Estimating Available Band>

The channel use condition load can be determined based on available bands estimated by first band estimation section 471 and second band estimation section 472. Here, a specific example of the technique of estimating available bands will be described.

First band estimation section 471 and second band estimation section 472 estimate available bands in the route between the corresponding face and a data storage node according to TFRC (TCP Friendly Rate Control, see RFC3448). First band estimation section 471 and second band estimation section 472 will be generically called "band estimation sections" as appropriate hereinafter.

Estimation of bands using TFRC requires measurement of RTTs, measurement of a loss event rate and finding of a packet size.

Measurement of RTTs is as described above.

The loss event rate is a rate of incidence of packet loss events by assuming that packet losses which have occurred within an RTT time are calculated as a single loss. Since transmissions of interest packets are managed as described above, it is possible to know the number of interest packets per unit time. Therefore, the loss event rate can be easily calculated from the presence or absence of reception of the corresponding data packet.

The packet size can be found from the service type of target data. When, for example, a service of providing target data is transmission of a video medium, a packet length such as 1280 bytes or 512 bytes used statically in such transmission can be adopted as the packet size. When a service of providing target data is transmission of a speech medium and a packet size of a fixed length is adopted, that packet size can be adopted as the packet size. Alternatively, a statistical value (e.g., average value) of the size of a data packet received for each face can be adopted as the packet size.

The band estimation section estimates available band Xcal using following equation 5. Here, R is an RTT, p is a loss event rate, S is a packet length and t_RTO is a timeout period or 4 Rs.

[5]

$$Xcal = \frac{8s}{R\left(\sqrt{2p/3} + \text{t\_RTO} \times \sqrt{3p/8} \times p \times (1+32p^2)\right)} \qquad \text{(Equation 5)}$$

Note that the band estimation section may transmit the calculated available band to transmission terminal 300. Transmission terminal 300 may change the encoding rate of video data based on the received available band. More specifically, transmission terminal 300 may instruct the encoder of video data to change a target bit rate so that the band consumed by the data packet transmitted falls to or below the available band.

When, for example, the average reception bit rate of a data packet exceeds the available band at the corresponding face, the reception measuring section may temporarily postpone retransmission of an interest packet. That is, the reception measuring section may retransmit the interest packet not at a point in time at which the timeout period comes, but after a lapse of a predetermined time after the timeout period.

Through such an operation, reception terminal 400 can determine an appropriate timeout period every time an interest packet is transmitted for each communication interface. That is, reception terminal 400 can retransmit an interest packet with an appropriate frequency by flexibly responding to a change in the CCN node connected, a change in the data storage node and a change in the congestion state.

<Operation Example of Entire Communication System>

Hereinafter, a specific operation example of entire communication system 100 will be described with reference to FIG. 2.

In the present embodiment, the states of connections of first reception terminal $400_1$ and second reception terminal $400_2$ with CCN network 200 are assumed as follows.

In the present embodiment, as the time passes, first reception terminal $400_1$ moves from first position P1 through second position P2 to third position P3. First reception terminal $400_1$ is located at first position P1 from time t=1 to 3 (the unit is second, for example), at second position P2 from time t=3 to 6 and at third position P3 from time t=6 to 10.

First position P1 is a position at which first reception terminal $400_1$ performs radio communication with first CCN router $210_1$ and second CCN router $210_2$. Second position P2 is a position at which first reception terminal $400_1$ performs radio communication with second CCN router $210_2$ and fourth CCN router $210_4$. Third position P3 is a position at which first reception terminal $400_1$ performs radio communication with fourth CCN router $210_4$ and fifth CCN router $210_5$.

That is, the two connection destinations of first reception terminal $400_1$ change with time. This is, for example, a case where first reception terminal $400_1$ moves while maintaining connections with a plurality of channels and changes the connection destinations accordingly. The plurality of channels are, for example, combinations of a wireless LAN or the like and a public radio channel such as 3G (3rd Generation) or 4G (4th Generation). The connection destination is, for example, an access point of a wireless LAN or a base station of a public radio channel.

Second reception terminal $400_2$ is located at fourth position P4 from time t=4 to 30. Fourth position P4 is a position at which second reception terminal $400_2$ performs radio communication with third CCN router $210_3$ and fifth CCN router $210_5$.

That is, while first reception terminal $400_1$ is connected to second CCN router $210_2$ and fourth CCN router $210_4$, second reception terminal $400_2$ starts to access third CCN router $210_3$ and fifth CCN router $210_5$.

Suppose that both first reception terminal $400_1$ and second reception terminal $400_2$ request video data stored in transmission terminal 300 at time t=0 (hereinafter simply referred to as "video data") as a reception target. More specifically, first reception terminal $400_1$ and second reception terminal $400_2$ transmit an interest packet that specifies pieces of video data to CCN network 200.

Suppose that transmission terminal 300 is in a transmittable state for data whose service name is "/service-liveAndStoredStreaming/session-a/video/time-seq-table/" from time t=0. The "transmittable state" refers to a state in which it is possible to receive an interest packet and store the divided pieces of data specified by the corresponding interest packet in the data packet and return them. Furthermore, suppose that transmission terminal 300 stores time sequence table 520 shown in FIG. 4.

Note that information relating to a data packet cache situation is successively shared among first CCN router $210_1$ to fifth CCN router $210_5$ through a route control protocol. Such information is information indicating which CCN router 210 caches a data packet corresponding to what content name with regard to a specific name space. The information is updated every certain time or every time disconnection of a link (channel) between CCN routers 210 is detected.

Each CCN router 210 calculates a logical distance of each piece of data to the data storage node and transfers the interest packet that specifies the data to a channel corresponding to a shortest logical distance. More specifically, a logical weight is assigned to each link between CCN routers 210 and the shortest route in a graph structure with this weight taken into consideration is calculated using Dijkstra's OSPF (Open Shortest Path First) algorithm. A version of this protocol extended for CCN is known as OSPFN (OSPF for Named-data networking) (see NPL 2).

Note that in the following description, the interest packet that specifies a content name "/service-liveAndStoredStreaming/session-a/video/time-seq-table/range (1, 3)" is called "interest packet A."

Of the interest packets requesting a divided piece of data having a serial number of "1," one transmitted by first reception terminal $400_1$ is called "interest packet B-1." Of the interest packets requesting a divided piece of data having a serial number of "1," one transmitted by second reception terminal $400_2$ is called "interest packet C-1." That is, both interest packet B-1 and interest packet C-1 are interest packets that specify a content name "/service-liveAndStoredStreaming/session-avideo/sequential-number/1."

A data packet in response to interest packet B-1 or interest packet C-1 is called "data packet-1." That is, data packet-1 is a data packet that stores data having a content name "/service-liveAndStoredStreaming/session-a/video/sequential-number/1."

An interest packet requesting a divided piece of data having a serial number of "31" is called "interest packet-31." That is, interest packet-31 is an interest packet that specifies a content name "/service-liveAndStored Streaming/session-a/video/sequential-number/31."

A data packet in response to interest packet-31 is called "data packet-31." That is, data packet-31 is a data packet that stores data having a content name "/service-liveAndStoredStreaming/session-a/video/sequential-number/31."

First of all, suppose that first reception terminal $400_1$ issues interest packet A from time t=1 to 3 (that is, when located at first position P1). This interest packet A arrives at transmission terminal 300 via CCN network 200.

Upon receiving interest packet A, transmission terminal 300 refers to time sequence table 520 (see FIG. 4) and responds thereto by including a start serial number of a group of divided pieces of data corresponding to interest packet A in the data packet. Here, the content name indicates that "returning of divided pieces of data corresponding to video captured from time t=1 to time t=2" is requested. For this reason, transmission terminal 300 reports the serial number of "1" as a start serial number to reception terminal 400.

At this time, transmission terminal 300 may respond thereto by including an end serial number of the group of divided pieces of data corresponding to interest packet A in the data packet. For example, suppose that a divided piece of data having a serial number of "30" corresponds to time t=3. In this case, transmission terminal 300 reports the serial number of "30" to reception terminal 400 as the end serial number.

Then, first reception terminal $400_1$ transmits interest packet B-1 from first face 421 and second face 422 respectively. If the communication channel is in a good condition, two transmitted interest packets B-1 arrive at first CCN router $210_1$ and second CCN router $210_2$ respectively. Furthermore, when the communication channel is congested or when the radio communication radio wave is in a bad condition, two transmitted interest packets B-1 may arrive at neither first CCN router $210_1$ nor second CCN router $210_2$ but may be lost.

Two interest packets B-1 that have arrived at first CCN router $210_1$ and second CCN router $210_2$ are transferred to the data storage node according to the CCN transfer rule.

At this point in time (time t=3), suppose that first reception terminal $400_1$ is first reception terminal 400 to request data. In this case, since no CCN router 210 has cached any data packet corresponding to interest packet B-1 yet, two interest packets B-1 are transferred to transmission terminal 300. Therefore, interest packet B-1 that has arrived at first CCN router $210_1$ is transferred to transmission terminal 300.

On the other hand, interest packet B-1 that has arrived at second CCN router $210_2$ is transferred to first CCN router $210_1$. However, when first CCN router $210_1$ has already transferred interest packet B-1 first, the transfer is recorded in a PIT of first CCN router $210_1$. For this reason, interest packet B-1 that arrives at first CCN router $210_1$ from second CCN router $210_2$ is not transferred this time.

Upon receiving interest packet B-1, transmission terminal 300 transmits data packet-1 that stores the corresponding divided piece of data in a direction opposite to the direction in which interest packet B-1 was received. That is, transmission terminal 300 returns data packet-1 to first CCN router $210_1$.

Upon receiving data packet-1, first CCN router $210_1$ caches this, deletes the corresponding entry from the PIT and transfers data packet-1 to first reception terminal $400_1$ which is the transmitter of interest packet B. Note that when another transmitter of interest packet B is registered with the PIT, first CCN router transfers data packet-1 to the transmitter as well.

Likewise, communication system 100 consecutively issues a plurality of interest packets with serial numbers such as "2, 3, . . . , 30" while first reception terminal $400_1$ is located at first position P1 and returns a plurality of corresponding data packets.

Next, at time t=3, first reception terminal $400_1$ moves to second position P2. At this time, first reception terminal $400_1$ deletes first face 421 logically and disconnects the connection with first CCN router $210_1$. First reception terminal $400_1$ then generates a new face (which can also be treated as new first face 421), which is connected to fourth CCN router $210_4$.

Suppose that first reception terminal $400_1$ issues interest packet-31 from time t=3 to 6 (that is, when located at second position P2). This interest packet-31 arrives at transmission terminal 300 via CCN network 200.

Transmission terminal 300 returns data packet-31. That is, data packet-31 is transferred through CCN network 200 and arrives at first reception terminal $400_1$. At this time, data packet-31 is cached in first CCN router $210_1$ and second CCN router $210_2$.

Here, at time t=4, suppose that second reception terminal $400_2$ transmits interest packet C-1 to third CCN router $210_3$ and fifth CCN router $210_5$ respectively. In this case, third CCN router $210_3$ transfers interest packet C-1 to, for example, first CCN router $210_1$ which has a similar logical distance. Similarly, fifth CCN router $210_5$ transfers interest packet C-1 to, for example, fourth CCN router $210_4$ which has a similar logical distance. Fourth CCN router $210_4$ transfers this interest packet C-1 to, for example, second CCN router $210_2$ which has a similar logical distance.

Since first CCN router $210_1$ and second CCN router $210_2$ have already cached data packet-1, these routers return data packet-1 by themselves. Data packet-1 transmitted by first CCN router $210_1$ is returned through third CCN router $210_3$ to second reception terminal $400_2$. Data packet-1 transmitted from second CCN router $210_2$ is returned through fourth CCN router $210_4$ and fifth CCN router $210_5$ to second reception terminal $400_2$.

That is, second reception terminal $400_2$ receives data packet-1 from both the face connected to third CCN router $210_3$ and the face connected to fifth CCN router $210_5$. Suppose that the face connected to third CCN router $210_3$ is first face 421. Suppose that the face connected to fifth CCN router $210_5$ is second face 422.

The RTT in first face 421 is a time period after second reception terminal $400_2$ transmits interest packet C-1 from first face 421 until the corresponding data packet is received. The RTT in second face 422 is a time period after second reception terminal $400_2$ transmits interest packet C-1 from second face 422 until the corresponding data packet is received. As described above, second reception terminal $400_2$ measures an RTT for each face and determines a timeout period for each face according to a timeout determination policy corresponding to a service name.

Since RTT differs from one face to another, uniform playout buffer control (that is, timeout control of a playback time in data storage section 480) alone is insufficient for high reliability data packet transmission. When retransmission timing of an interest packet is delayed, divided pieces of data making up video data may not arrive by the timing at which data should be played back. On the other hand, when the timing at which data should be played back is delayed, such an event can be prevented, but real-timeness may be lost and the value of live coverage is degraded. For example, this may not be appropriate for when holding a conversation while watching a live coverage.

In this respect, reception terminal 400 according to the present embodiment determines a timeout period for each face, and can thereby retransmit an interest packet at appropriate timing and acquire a data packet at high-speed timing.

Next, first reception terminal $400_1$ moves to third position P3 at time t=6. First reception terminal $400_1$ issues an interest packet that requests a divided piece of data having a serial number of "61" from time t=6 to 10 (that is, when located at third position P3).

The data packet storing the divided piece of data having a serial number of "61" is cached in, for example, fourth CCN router $210_4$ and fifth CCN router $210_5$. On the other hand, the data packet storing the divided piece of data having a serial number of "1" is cached in, for example, first CCN router $210_1$. The distance between second reception terminal $400_2$ and fifth CCN router $210_5$ is shorter than the distance between second reception terminal $400_2$ and first CCN router $210_1$. Therefore, retransmission of the interest packet that requests the divided piece of data having a serial number of "61" in second reception terminal $400_2$ can be performed at timing earlier than retransmission of the interest packet that requests the divided piece of data having a serial number of "1."

As described above, reception terminal 400 according to the present embodiment can measure an RTT between reception terminal 400 and the data storage node for every two faces and determine a timeout period. Thus, reception terminal 400 according to the present embodiment can receive target data at a high speed from CCN network 200 which is a best-effort type network using CCN while preventing the network load from increasing. Therefore, for example, when the target data is video data, reception terminal 400 according to the present embodiment enables video to be played back with a low delay, with no data loss.

In addition, reception terminal 400 according to the present embodiment selects a timeout determination policy according to the service type of the target data. This allows reception terminal 400 according to the present embodiment to retransmit an interest packet at timing appropriate for the service type of the target data and receive data with higher reliability.

A case has been described above where reception terminal 400 transmits an identical interest packet from both of the two faces, but the present invention is not limited to this. Reception terminal 400 may, for example, transmit interest packets relating to divided pieces of data having even-numbered serial numbers from only first face 421 and transmit interest packets relating to divided pieces of data having odd-numbered serial numbers from only second face 422.

Embodiment 3

This embodiment of the present invention is an example of a specific aspect of the present invention when the present invention is applied to an inter-vehicle communication system.

<Configuration of Communication System>

Figure 13:
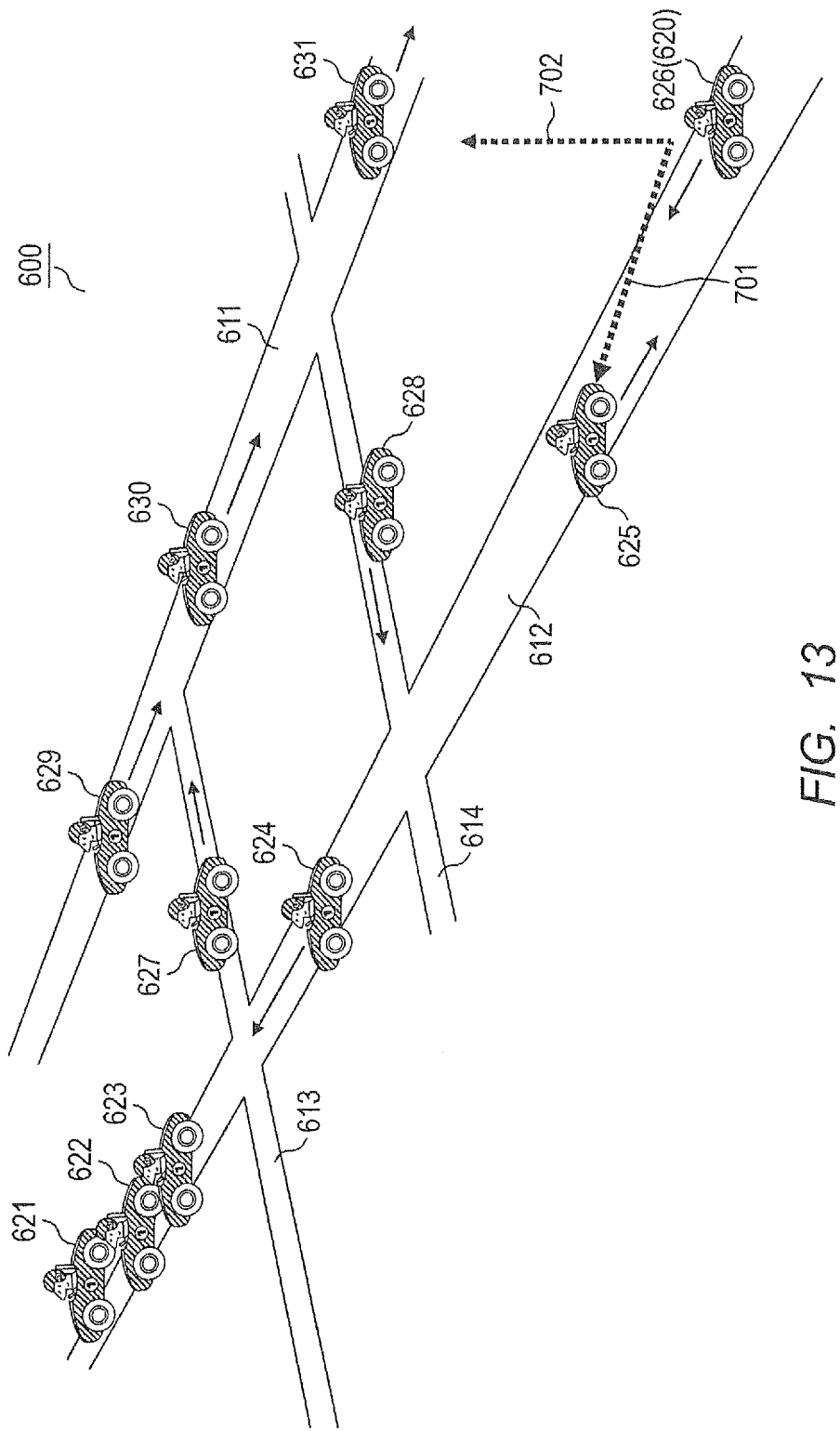
FIG. 13 is a system configuration diagram illustrating a configuration example of an inter-vehicle communication system according to Embodiment 3 of the present invention.

FIG. 13 is a system configuration diagram illustrating a configuration example of an inter-vehicle communication system according to the present embodiment.

As shown in FIG. 13, inter-vehicle communication system 600 is constructed of first to eleventh vehicles 621 to 631 positioned on first to fourth roads 611 to 614.

First road 611 and second road 612 are parallel highways connecting Tokyo and Yokohama. Suppose that first road 611 is not congested but second road 612 is congested. Third road 613 and fourth road 614 are community roads connecting first road 611 and second road 612.

First to eleventh vehicles 621 to 631 are vehicles mounted with a CCN node according to the present embodiment as part of, for example, a car navigation system. Here, the CCN node according to the present embodiment is a CCN node having the functions of transmission terminal 300, CCN router 210 and reception terminal 400 according to the present embodiment. Since first to eleventh vehicles 621 to 631 have an identical configuration with regard to the CCN functions, these vehicles are generically called "vehicle 620" as appropriate.

Each vehicle 620 recognizes other vehicles 620 with short physical distances from vehicle 620 through radio communication and has a logical channel connection with other vehicles 620. Vehicle 620 having a short physical distance refers to a vehicle located within a radio communication area of the other party. Examples of sets of vehicles 620 having a short physical distance include first vehicle 621 and second vehicle 622, second vehicle 622 and third vehicle 623, third vehicle 623 and fourth vehicle 624, and fourth vehicle 624 and seventh vehicle 627. That is, network-shaped communication routes connected to each other by a plurality of logical channels are formed among first to eleventh vehicles 621 to 631.

Route information indicating a configuration of communication routes and information on a name space are exchanged among first to eleventh vehicles 621 to 631 by, for example, OLSR (Optimized Link State Routing). OLSR is one of route control protocols between ad-hoc networks.

That is, inter-vehicle communication system 600 is enabled to transfer interest packets and data packets.

<Definition of Function Names>

Suppose that a plurality of functions are defined in advance as functions available as content names in inter-vehicle communication system 600.

Figures 14, 15, 16:
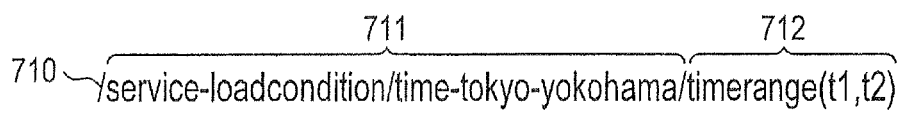
FIG. 14 is a diagram illustrating function examples according to Embodiment 3.
FIG. 15 is a diagram illustrating an example of a content name according to Embodiment 3.
FIG. 16 is a diagram illustrating a configuration example of a data packet according to present Embodiment 3.

FIG. 14 is a diagram illustrating function examples defined in inter-vehicle communication system 600.

As shown in FIG. 14, a plurality of functions such as "arearange (r1, r2)", "timerange (t1, t2)" and "latest" are defined in inter-vehicle communication system 600.

The function "arearange (r1, r2)" is a function to specify information relating to a spatial range (range of observation positions) from position r1 to position r2. That is, an interest packet that specifies a content name including this function is interpreted as requesting a reply of information relating to a spatial range from position r1 to position r2.

Such functions allow, for example, information on a range identified by a set of longitude and latitude, information on the Tokyo Metropolitan area, information on the Tokyo-Yokohama section of Japan National Route 1 to be specified as reply targets.

For example, information indicating a floor, information indicating reference base station 1, and a function that designates a distance to reference base station 2 as an argument enable a three-dimensional position range to be specified. Such three-dimensional position range specification enables a search for a position of a product exhibited on a third floor of a specific building or search for information on electric power meter reading of a condominium or the like.

The function "timerange (t1, t2)" is a function to specify information relating to a time range (range of time of occurrence) from time t1 to time t2. That is, an interest packet that specifies a content name including this function is interpreted as requesting a reply of information relating to a time range from time t1 to time t2. In the present embodiment, use of this function allows information within a few minutes immediately before the current time or information on a specific period in the past to be specified as a reply target.

The function "latest" is a function to specify latest information. That is, an interest packet that specifies a content name including this function is interpreted as requesting a reply of latest information stored in a data storage node. In the present embodiment, use of this function allows, for example, a latest still image, latest news article (publicity documents), latest remarks on a bulletin board, the current value of a thermometer or a latest hash value of a data store to be specified as a reply target.

Upon receiving an interest packet that requests data stored in each vehicle 620 in FIG. 13 from another vehicle 620, vehicle 620 returns a data packet storing the data.

Here, suppose that each vehicle 620 periodically transmits an interest packet through radio communication. Thus, suppose that each vehicle 620 shares information relating to a passage time of the Tokyo-Yokohama section of the road network (hereinafter referred to as "Tokyo-Yokohama section road information") with a plurality of vehicles through inter-vehicle communication.

In order to describe an information flow when information is shared, assume a case where sixth vehicle 626 transmits an interest packet through a range search.

Note that the service name of the Tokyo-Yokohama section road information is "service-loadcondition/time-tokyo-yokohama."

FIG. 15 is a diagram illustrating an example of a content name of data requested by sixth vehicle 626.

As shown in FIG. 15, content name 710 of an interest packet transmitted by sixth vehicle 626 is made up of service name 711 of the Tokyo-Yokohama section road information and function 712 that specifies a time range from time t1 to time t2. The interest packet that specifies such content name 710 is interpreted as requesting a reply of the Tokyo-Yokohama section road information from time t1 to time t2.

The interest packet transmitted by sixth vehicle 626 in FIG. 13 arrives at both fifth vehicle 625 connected via first face 421 and eleventh vehicle 631 connected via second face 422 (arrows 701 and 702).

For example, fourth vehicle 624 can transmit an interest packet similar to the interest packet transmitted by sixth vehicle 626 prior to sixth vehicle 626. Alternatively, there may be a case where fourth vehicle 624 itself measures result data by running along the road and thereby generates Tokyo-Yokohama section road information. In these cases, fourth vehicle 624 caches the corresponding data packet.

In this case, upon receiving the interest packet transmitted by sixth vehicle 626 via fifth vehicle 625 and eighth vehicle 628, fourth vehicle 624 returns target data to sixth vehicle 626.

On the other hand, when eighth vehicle 628 is connected to fourth vehicle 624 and tenth vehicle 630, the interest packet that has arrived at eighth vehicle 628 also arrives at tenth vehicle 630. When tenth vehicle 630 stores no target data and is connected to ninth vehicle 629, the interest packet also arrives at ninth vehicle 629. There may be a case where ninth vehicle 629 stores information from other vehicle 620 that has passed through first road 611.

When each vehicle 620 supports service name 711 (see FIG. 15) specified by the interest packet, each vehicle 620 executes function 712 (see FIG. 15) specified by the interest packet. When each vehicle 620 stores matching data (that is, when it is a data storage node), each vehicle 620 generates a data packet that stores the data and returns the data to sixth vehicle 626 which is a requester.

<Configuration of Data Packet>

FIG. 16 is a diagram illustrating a configuration example of a data packet returned to sixth vehicle 626.

As shown in FIG. 16, data packet 720 is made up of, for example, content name 721, signature 722, signed information 723, observation time 724, passage time 725, and passage route information 726.

Content name 721 is a content name specified by the interest packet (that is, content name of data stored in data packet 720). Signature 722 and signed information 723 are information for verifying the authenticity of data (see NPL 1). Observation time 724, passage time 725 and passage route information 726 are Tokyo-Yokohama section road information and information generated by the CCN node which is the transmitter from past running data.

For example, suppose that certain vehicle 620 runs from Tokyo to Yokohama in 30 minutes until time to (where t1<tα<t2) via Japan National Route No. 15. In this case, for example, an application mounted in vehicle 620 as part of a car navigation system describes a character string indicating time to as observation time 724 and a character string indicating 30 minutes in passage time 725. The application also describes a character string indicating the Tokyo-Yokohama section of Japan National Route No. 15 as passage route information 726. These descriptions are written in, for example, a TLV (Type Length Value) format. The application may also describe these pieces of information in data packet 720 organized as one piece of information using predefined specific delimiters.

When a plurality of pieces of data match, the data storage node may return a data packet that repeatedly describes observation time 724 to passage route information 726. The number of repeated descriptions is, for example, a finite number of 10 or fewer.

Sixth vehicle 626 that has received data packet 720 reconstructs original Tokyo-Yokohama section road information from, for example, data packet 720 and presents this as part of the function of the car navigation system to the driver.

Sixth vehicle 626 may repeat issuance of interest packets while narrowing a time range or position range which becomes a range search target to the most recent time and nearest range. This allows sixth vehicle 626 to present information relating to an optimum traffic route to the driver.

Interest packets or data packets may be lost depending on communication conditions among first to eleventh vehicles 621 to 631. However, sixth vehicle 626 is provided with a plurality of faces and calculates a timeout for each face, and can thereby transmit a retransmission request at a high speed. For example, between second road 612 and fourth road 614, sixth vehicle 626 can notify the driver that it is possible to pass through the Tokyo-Yokohama section in a shorter time by running along first road 611 before approaching the intersection.

The content name can take on various modes in addition to the above-described example.

FIG. 17 is a diagram illustrating other examples of the content name.

In FIG. 17, content name 730 is an example of the content name that specifies information on a range from time t1 to time t2 of the information indicating positions where wheels slipped in the Tokyo-Yokohama section. Content name 740 is an example of the content name that specifies information on a range from time t1 to time t2 of the information indicating periods during the wiper operated in the Tokyo-Yokohama section. Content name 750 is an example of the content name that specifies information on a range from position xy1 to position xy2 of the information indicating a temperature of a specific area observed today. Content name 760 is an example of the content name that specifies information on a range from position xy1 to position xy2 of the information indicating a temperature of a specific area observed recently.

Thus, even in an inter-vehicle communication environment in which packet losses occur, each vehicle 620 to which the present invention is applied can acquire congestion information at appropriate timing. That is, the present invention is suitable for inter-vehicle communication as well. More specifically, the present invention is also applicable to constructing an application that collects information with a time range and a time period range appropriately narrowed down as the vehicle approaches a congested section. Thus, even in an environment in which packet losses occur, the present invention can acquire information with higher accuracy at appropriate timing before passing through an intersection at which the vehicle should change the course.

Note that the name space of a content name specified by the reception terminal according to the present invention is not limited to the contents of the above-described embodiments, and the name space defined, for example, in NPL 2 may be adopted. The above-described embodiments assume that CCN is operated on a best-effort type network, but application of the present invention is not limited to this. The present invention is likewise applicable to a case where ICN (Information Centric Network) is operated on a best-effort type network. Here, the term "ICN" refers to a type of communication network that assigns not only a hierarchic name but a flat ID to a content and acquires information from an appropriate cache in the communication network.

A reception terminal disclosed herein includes: a reception that is configured to connect to a communication network; an issuance management section that transmits a data request packet to the communication network, the data request packet being a packet for requesting a data reply; and an H-RTT measuring section that determines a timeout period which is a time period until the data request packet is retransmitted and that retransmits the data request packet according to the determined timeout period until the reception stack receives the data, in which the reception stack connects to the communication network via a plurality of communication interfaces, the issuance management section transmits the data request packet from each of the plurality of communication interfaces, and the H-RTT measuring section measures, for each of the communication interfaces, an RTT (round trip time) between the communication interface and a data storage node and determines the timeout period for each of the communication interfaces based on the measured RTT, the data storage node being a node that stores the data.

In the reception terminal, the network may be a best-effort type network using CCN (content centric network), the communication interface may be a CCN face, and the data request packet may be a CCN interest packet.

In the reception terminal, when the reception stack receives the data, the H-RTT measuring section may stop retransmission of the data request packet in all of the plurality of communication interfaces.

The reception terminal may further include a call establishment section that determines the data which becomes a target of the reply request from among a plurality of pieces of data whose service types are defined and that establishes a call between the reception terminal and the data storage node, in which the H-RTT measuring section may determine a timeout determination policy for each piece of the data according to the service type for the piece of the data, the timeout determination policy being a policy in determining the timeout period based on the RTT.

In the reception terminal, the H-RTT measuring section may determine the timeout period from an exponential weighted average of a plurality of the RTTs measured in the past.

In the reception terminal, the H-RTT measuring section may determine whether or not to give priority to a reduction of load on a transmission route of the data over a reception speed of the data and may determine, on condition of determining that the reduction of the load is to be given priority over the reception speed, the timeout period from a maximum value of a plurality of the RTTs measured for a past predetermined section in all of the plurality of communication interfaces.

The reception terminal may further include a band estimation section that estimates an available band between the reception terminal and the data storage node for each of the communication interfaces, in which the H-RTT measuring section may determine for each of the communication interfaces whether or not to suppress transmission of the data request packet based on the available band estimated by the band estimation section.

A reception method disclosed herein includes: connecting to a communication network; transmitting a data request packet to the communication network, the data request packet being a packet for requesting a data reply; determining a timeout period which is a time period until the data request packet is retransmitted; and retransmitting the data request packet according to the determined timeout period, in which in the connecting, connection may be made to the communication network via a plurality of communication interfaces, in the transmitting, the data request packet may be transmitted from each of the plurality of communication interfaces, in the determining, an RTT (round trip time) between the communication interface and a data storage node may be measured for each of the communication interfaces, and the timeout period for each of the communication interfaces may be determined based on the measured RTT, the data storage node being a node that stores the data, and in the retransmitting, when the data is received, retransmission of the data request packet may be stopped in all of the plurality of communication interfaces.

The disclosure of Japanese Patent Application No. 2012-259985, filed on Nov. 28, 2012, including the specification, drawings and abstract is incorporated herein by reference in its entirety.

INDUSTRIAL APPLICABILITY

The present invention is useful as a reception terminal and a reception method capable of making both high-speed data reception and a reduction of network load even when data is received from a best-effort type network using CCN. The present invention is suitable for use in, for example, sharing of a live coverage of video, streaming delivery of stored data, sharing of congestion information, sharing of weather information or sharing of information on a road situation or the like in a best-effort type network using CCN.

REFERENCE SIGNS LIST

100 Communication system
200 CCN network
210 CCN router
$210_1$ First CCN router
$210_2$ Second CCN router
$210_3$ Third CCN router
$210_4$ Fourth CCN router
$210_5$ Fifth CCN router
211 Cache section
212 CCN transfer stack
220 Network connection media
300 Transmission terminal
310 Digital video camera
400 Reception terminal
$400_1$ First reception terminal
$400_2$ Second reception terminal
410 Reception stack
411 CCN reception stack
421 First face
422 Second face
430 Call establishment section
440 Issuance management section
450 H-RTT measuring section
451 First H-RTT measuring section
452 Second H-RTT measuring section
461 First retransmission queue section
462 Second retransmission queue section
471 First band estimation section
472 Second band estimation section
480 Data storage section 490 Video decoder section
600 Inter-vehicle communication system
611 First road
612 Second road
613 Third road
614 Fourth road
621 First vehicle
622 Second vehicle
623 Third vehicle
624 Fourth vehicle
625 Fifth vehicle
626 Sixth vehicle
627 Seventh vehicle
628 Eighth vehicle
629 Ninth vehicle
630 Tenth vehicle
631 Eleventh vehicle

The invention claimed is:

1. A reception terminal comprising:
a reception stack that is configured to connect to a communication network via a plurality of communication interfaces;
issuance management circuitry, which, in operation, transmits a data request packet to the communication network from each of the plurality of communication interfaces, the data request packet being a packet for requesting a data reply;
band estimation circuitry, which in operation, estimates an available band between the reception terminal and a data storage node for each communication interface of the plurality of communication interfaces, the data storage node being a node that stores the data; and
H-RTT measuring circuitry, which, in operation:
measures, for each of the communication interfaces, an RTT (round trip time) between the communication interface and the data storage node,
determines a timeout period, which is a time period until the data request packet is retransmitted, by at least:
identifying a service type associated with target data,
in response to determining that the service type is a first service type, applying a first function to a plurality of previously measured RTTs and setting the timeout period to an outcome of applying the first function to the plurality of previously measured RTTs, and
in response to determining that the service type is a second service type, applying a second function, different from the first function, to the plurality of previously measured RTTs and setting the timeout period to an outcome of applying the second function to the plurality of previously measured RTTs, and
retransmits the data request packet according to the determined timeout period until the reception stack receives the target data and determines for each of the communication interfaces whether or not to suppress transmission of the data request packet based on the available band estimated by the band estimation circuitry,
wherein the H-RTT measuring circuitry (i) determines whether or not to give priority to a reduction of load on a transmission route of the data over a reception speed of the data and, (ii) on a condition of determining that the reduction of the load is not to be given priority over the reception speed, the H-RTT measuring circuitry identifies the service type as the first service type, and (iii) on a condition of determining that the reduction of the load is to be given priority over the reception speed, the H-RTT measuring circuitry identifies the service type as the second service type, and
the outcome of applying the second function to the plurality of previously measured RTTs is not less than the outcome of applying the first function to the plurality of previously measured RTTs.

2. The reception terminal according to claim 1, wherein the network is a best-effort type network using CCN (content centric network),
the communication interface is a CCN face, and
the data request packet is a CCN interest packet.

3. The reception terminal according to claim 1, wherein, when the reception stack receives the data, the H-RTT measuring circuitry stops retransmission of the data request packet in all of the plurality of communication interfaces.

4. The reception terminal according to claim 1, further comprising a call establishment circuitry, which, in operation, determines the data which becomes a target of a reply request from among a plurality of pieces of data whose service types are defined and that establishes a call between the reception terminal and the data storage node.

5. The reception terminal according to claim 1, wherein applying the first function to the plurality of previously measured RTTs includes applying an exponential weighted average to the plurality of previously measured RTTs, and setting the timeout period to the outcome of applying the first function includes setting the timeout period to an outcome of the exponential weighted average applied to the plurality of previously measured RTTs.

6. The reception terminal according to claim 1, wherein in response to determining that the service type is the second service type, applying the second function includes applying a maximum value function to the plurality of previously measured RTTs, and wherein setting the timeout period to the outcome of applying the second function includes setting the timeout period to a maximum of the plurality of previously measured RTTs.

7. The reception terminal according to claim 1, wherein the band estimation circuitry estimates the available band to be inversely proportional to the measured RTT, the timeout period and an loss event rate.

8. A reception method comprising:
connecting a reception terminal to a communication network via a plurality of communication interfaces;
transmitting a data request packet to the communication network from each of the plurality of communication interfaces, the data request packet being a packet for requesting a data reply;
measuring, for each communication interface of the plurality of communication interfaces, an RTT (round trip time) between the communication interface and a data storage node, the data storage node being a node that stores the data;
estimating an available band between the reception terminal and the data storage node for each of the communication interfaces;
determining, for each communication interface of the plurality of communication interfaces, a timeout period, which is a time period until the data request packet is retransmitted, by at least:
identifying a service type associated with the data reply;
in response to determining that the service type is a first service type, applying a first function to a plurality of previously measured RTTs and setting the timeout period to an outcome of applying the first function to the plurality of previously measured RTTs; and in response to determining that the service type is a second service type, applying a second function, different from the first function, to the plurality of previously measured RTTs and setting the timeout period to an outcome of applying the second function to the plurality of previously measured RTTs;

retransmitting the data request packet according to the determined timeout period;

determining for each of the communication interfaces whether or not to suppress transmission of the data request packet based on the estimated available band; and when the data is received, ceasing retransmission of the data request packet in all of the plurality of communication interfaces, wherein identifying the service type includes:
(i) determining whether or not to give priority to a reduction of load on a transmission route of the data over a reception speed of the data;
(ii) on a condition of determining that the reduction of the load is not to be given priority over the reception speed, identifying the service type as the first service type; and
(iii) on a condition of determining that the reduction of the load is to be given priority over the reception speed, identifying the service type as the second service type, and the outcome of applying the second function to the plurality of previously measured RTTs is not less than the outcome of applying the first function to the plurality of previously measured RTTs.

9. The reception method according to claim 8, wherein:
the communication network is a best-effort type network using CCN (content centric network),
the communication interface is a CCN face, and
the data request packet is a CCN interest packet.

10. The reception method according to claim 8, further comprising:
determining the data which becomes a target of the reply request from among a plurality of pieces of data whose service types are defined;
establishing with the data storage node.

11. The reception method according to claim 8, wherein applying the first function to the plurality of previously measured RTTs in response to determining that the service type is the first service type includes applying an exponential weighted average to the plurality of previously measured RTTs, and wherein setting the timeout period to the outcome of applying the first function includes setting the timeout period to the outcome of applying the exponential weighted average to the plurality of previously measured RTTs.

12. The reception method according to claim 8, wherein applying the second function to the plurality of previously measured RTTs includes applying a maximum value function to the plurality of previously measured RTTs, and wherein setting the timeout period to the outcome of applying the second function to the plurality of previously measured RTTs includes setting the timeout period to a maximum value of the plurality of the previously measured RTTs.

13. The reception method according to claim 8, further comprising:
estimating the available band to be inversely proportional to the measured RTT, the timeout period and an loss event rate.

* * * * *